United States Patent [19]
Milliken et al.

[11] Patent Number: 5,298,206
[45] Date of Patent: Mar. 29, 1994

[54] METHOD AND APPARATUS FOR CASTING HOLLOW FIBER MEMBRANES

[75] Inventors: Robert D. Milliken; David R. Barnes, both of Columbia, Md.; Amy L. Foley, Natick, Mass.; Karen E. Dunleavy, Billerica, Mass.; Edward J. Doherty, Mansfield, Mass.

[73] Assignee: W. R. Grace & Co.-Conn., New York, N.Y.

[21] Appl. No.: 984,829

[22] Filed: Dec. 3, 1992

Related U.S. Application Data

[63] Continuation-in-part of Ser. No. 831,142, Feb. 4, 1992, abandoned.

[51] Int. Cl.⁵ .................. B29C 47/92; D01D 5/24
[52] U.S. Cl. ........................ 264/40.7; 264/41; 264/184; 264/209.2; 425/71; 425/135; 425/375; 425/382.3; 425/461
[58] Field of Search .............. 264/40.1, 40.7, 41, 264/178 R, 183, 184, 209.1, 209.2; 425/71, 135, 145, 375, 381.2, 382.3, 461

[56] References Cited

U.S. PATENT DOCUMENTS

| | | | |
|---|---|---|---|
| 4,284,594 | 8/1981 | Joh et al. | 264/41 |
| 4,322,381 | 3/1982 | Joh et al. | 264/41 |

Primary Examiner—Leo B. Tentoni
Attorney, Agent, or Firm—Margit Maus; William L. Baker

[57] ABSTRACT

An automated system for casting hollow fiber membranes into a variety of prescribed shapes, including spiral, linear, circular and rectangular. The system also has the capability to change the configuration during casting, which increases productivity. A co-extrusion die is rotated over a stationary coagulation bath A computer is used to control the motion of the die to make a membrane with the desired shape The nozzle is oriented in a manner that will compensate for distortions that occur in wall thickness in the area of a bend. In addition, the nozzle's annulus is offset to make the leading portion of the annulus slightly thicker and the trailing portion thinner at the point where the fluids exit the nozzle, which results in a uniformly symmetric wall thickness. A system embodying the invention includes X, Y and θ-directional servomotors 1A-1C (FIG. 1), each of which is coupled to an associated position encoder 2A-2C. The motors are controlled by a computer 3 via servodrivers 4 and an associated interface card. Also included in the system are a tub 5 for holding a coagulation bath, bearings 6, carriage 7, screw drive 8, rotary table 9 and co-extrusion die 10.

12 Claims, 26 Drawing Sheets

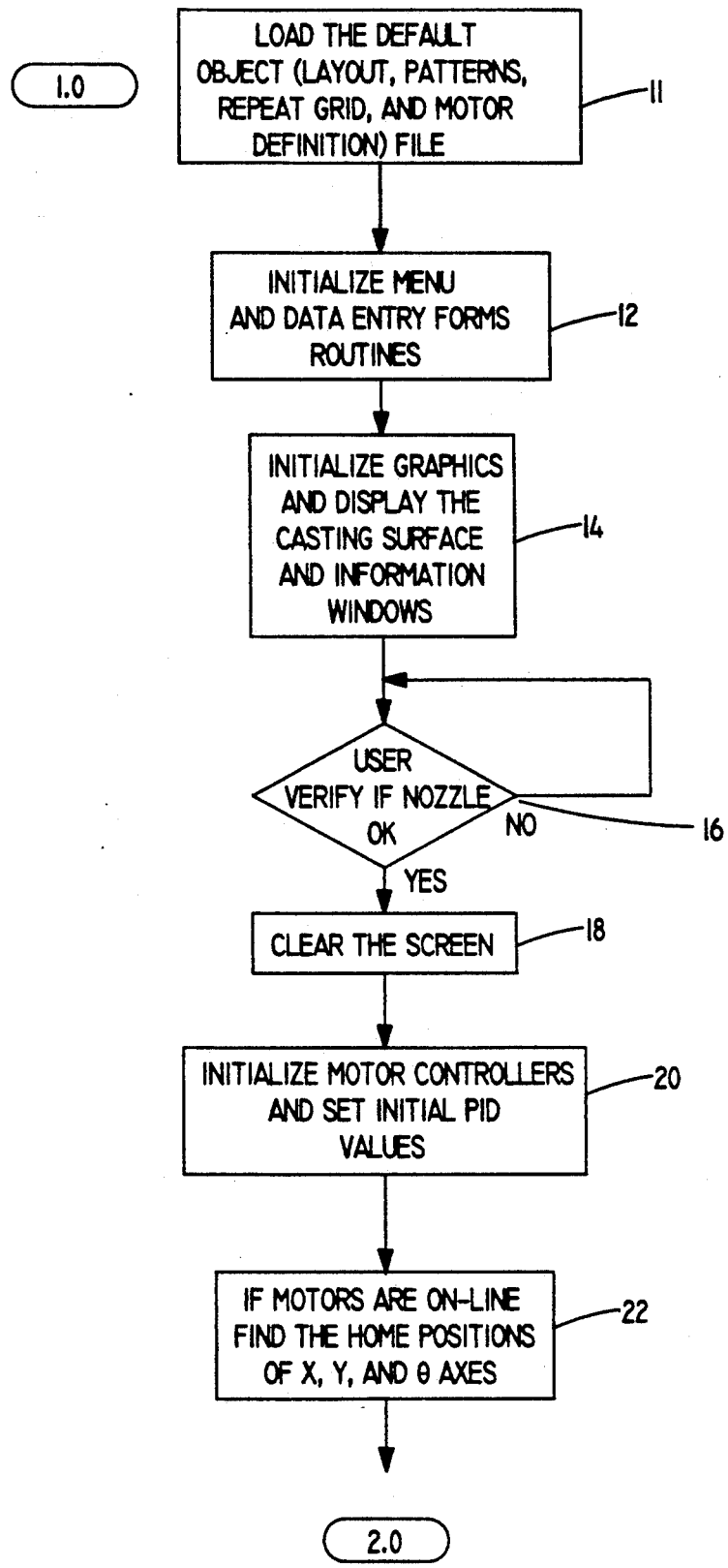
FIG. 3.1

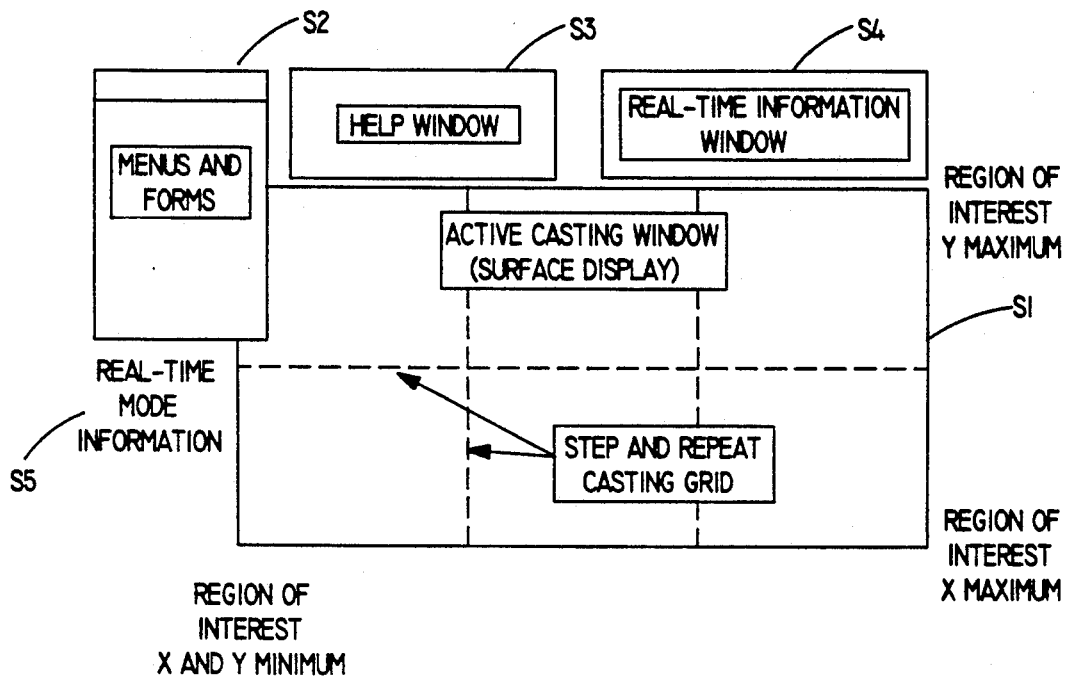
FIG. 3.2

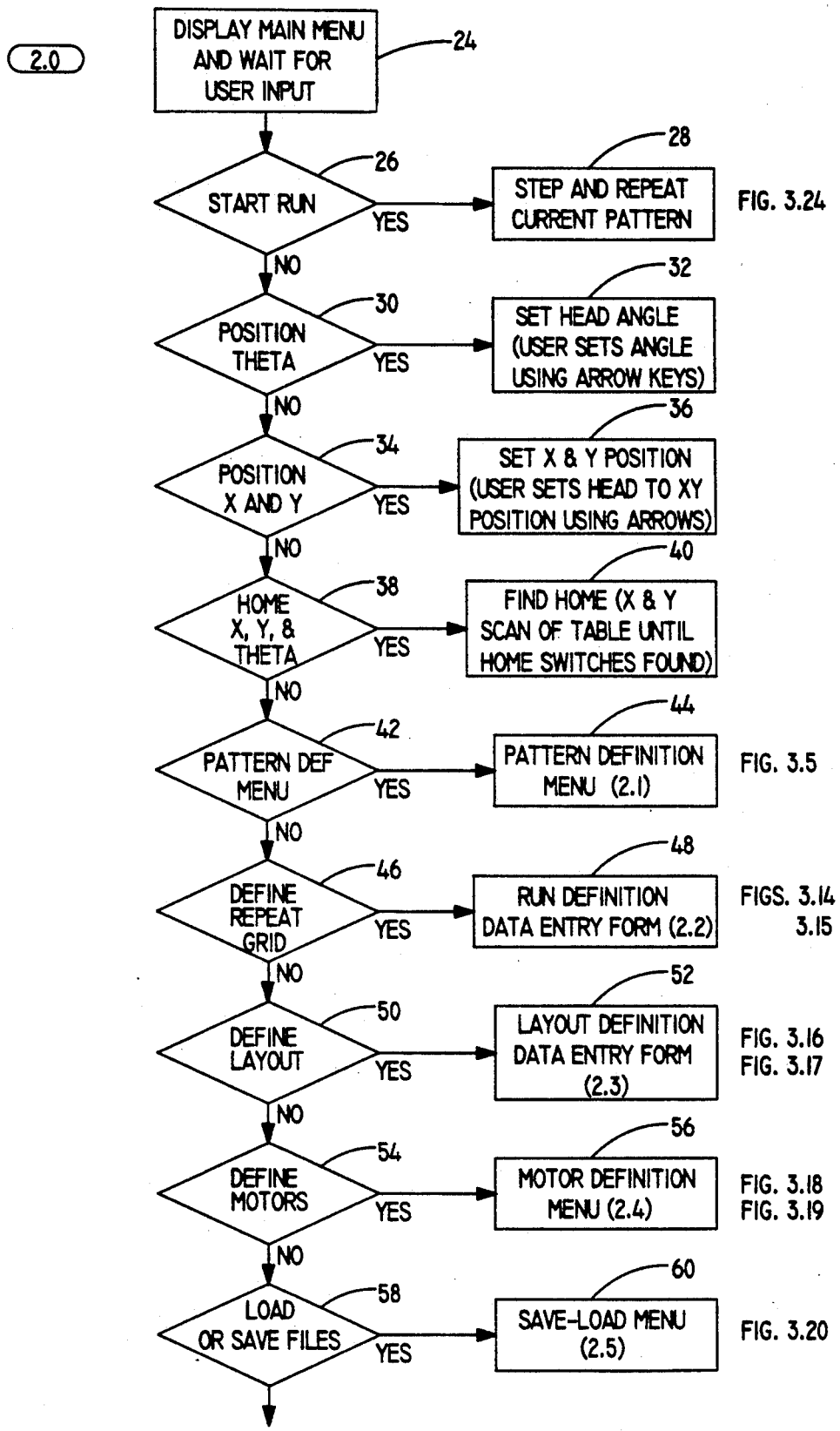
FIG. 3.3

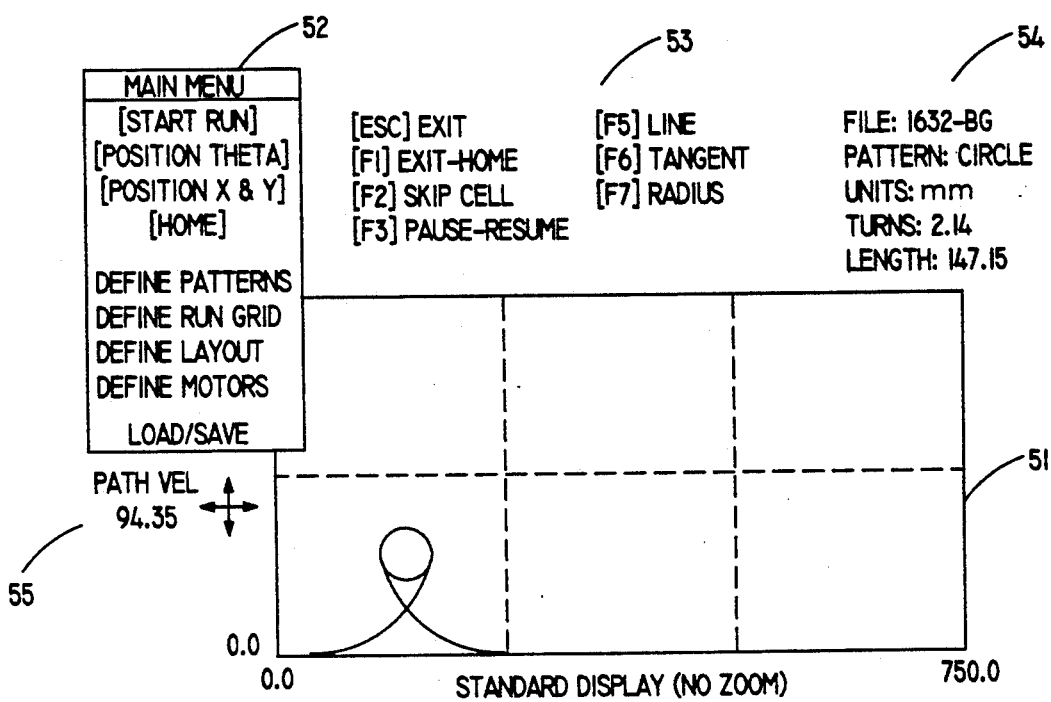
FIG. 3.4

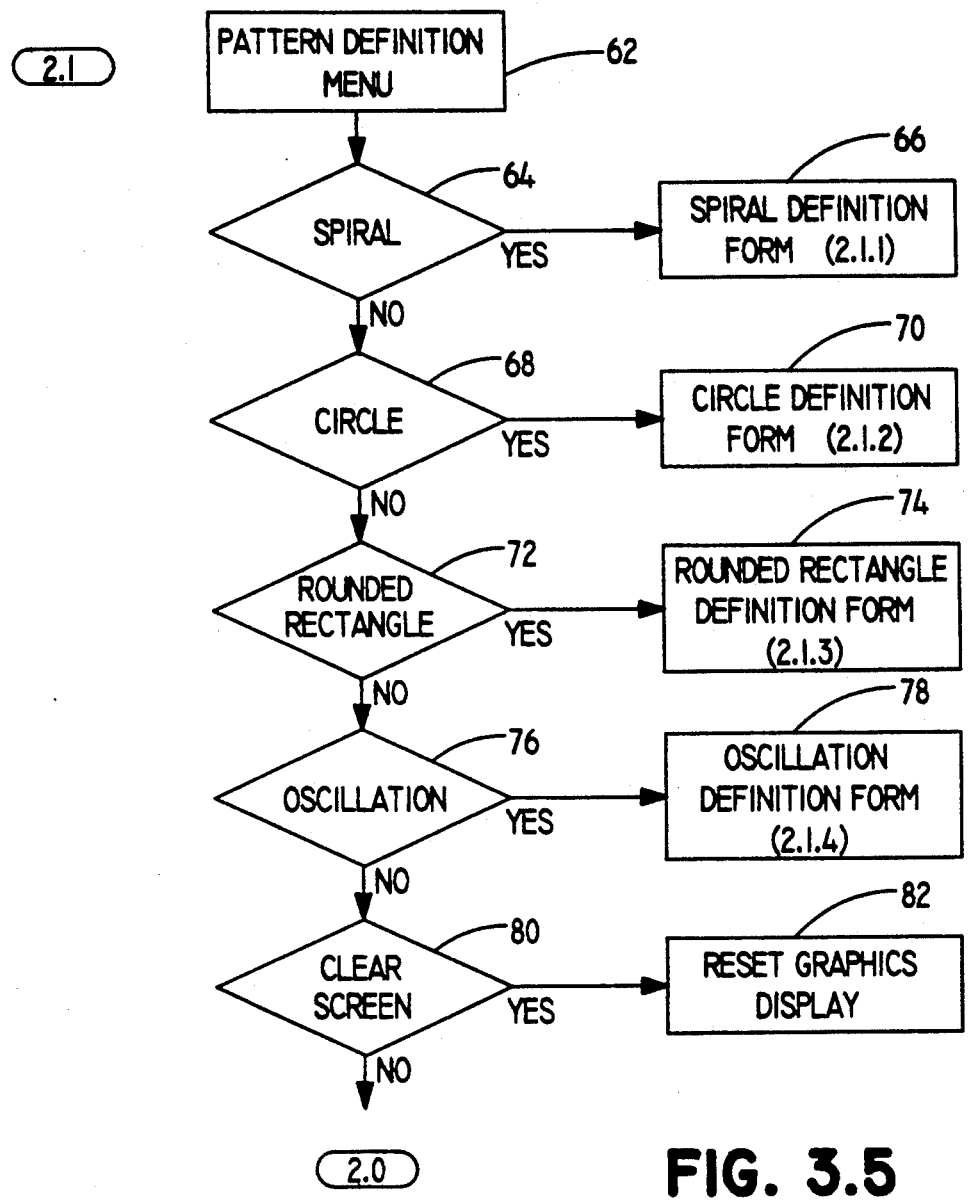
FIG. 3.5

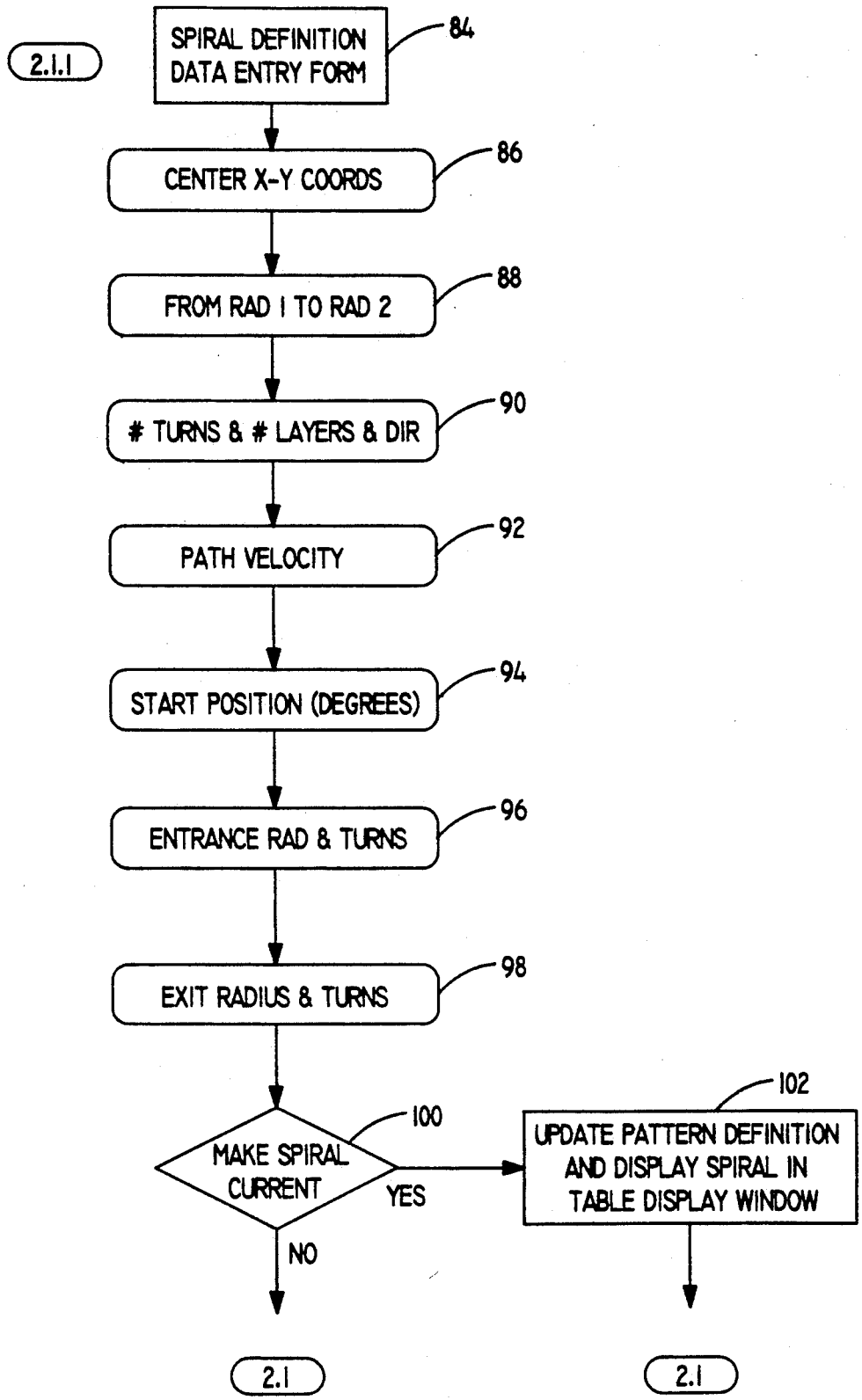
FIG. 3.6

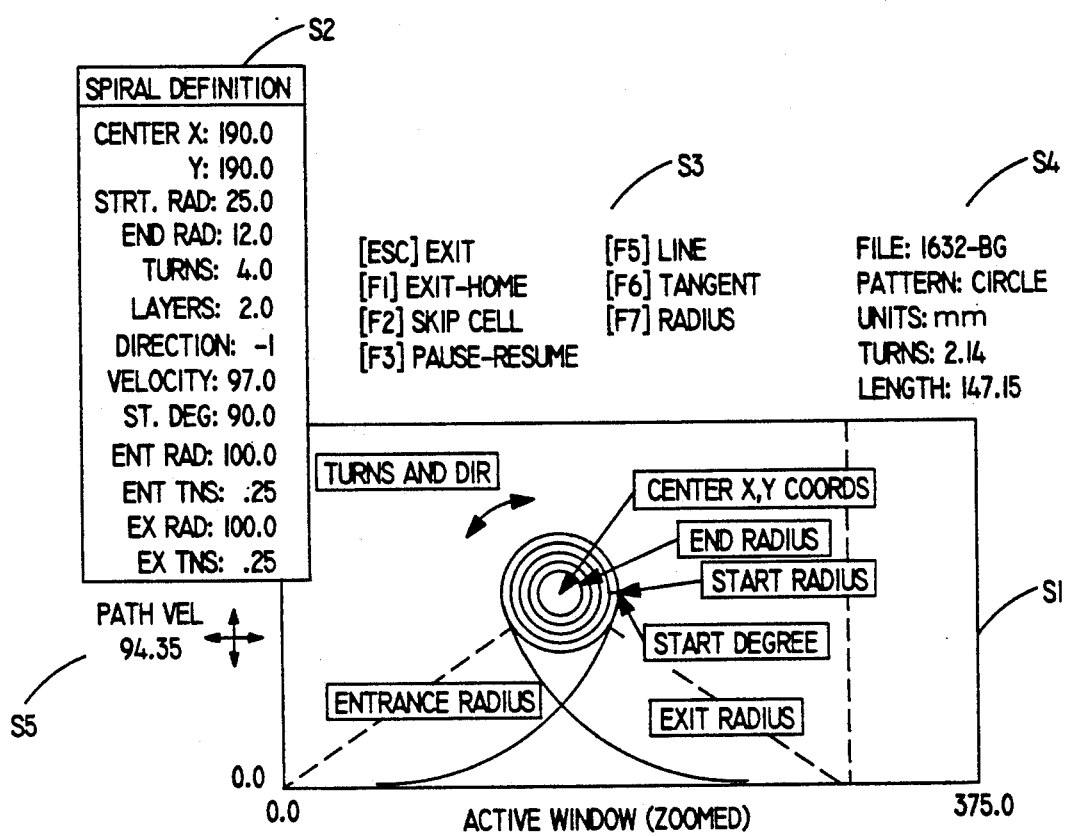
FIG. 3.7

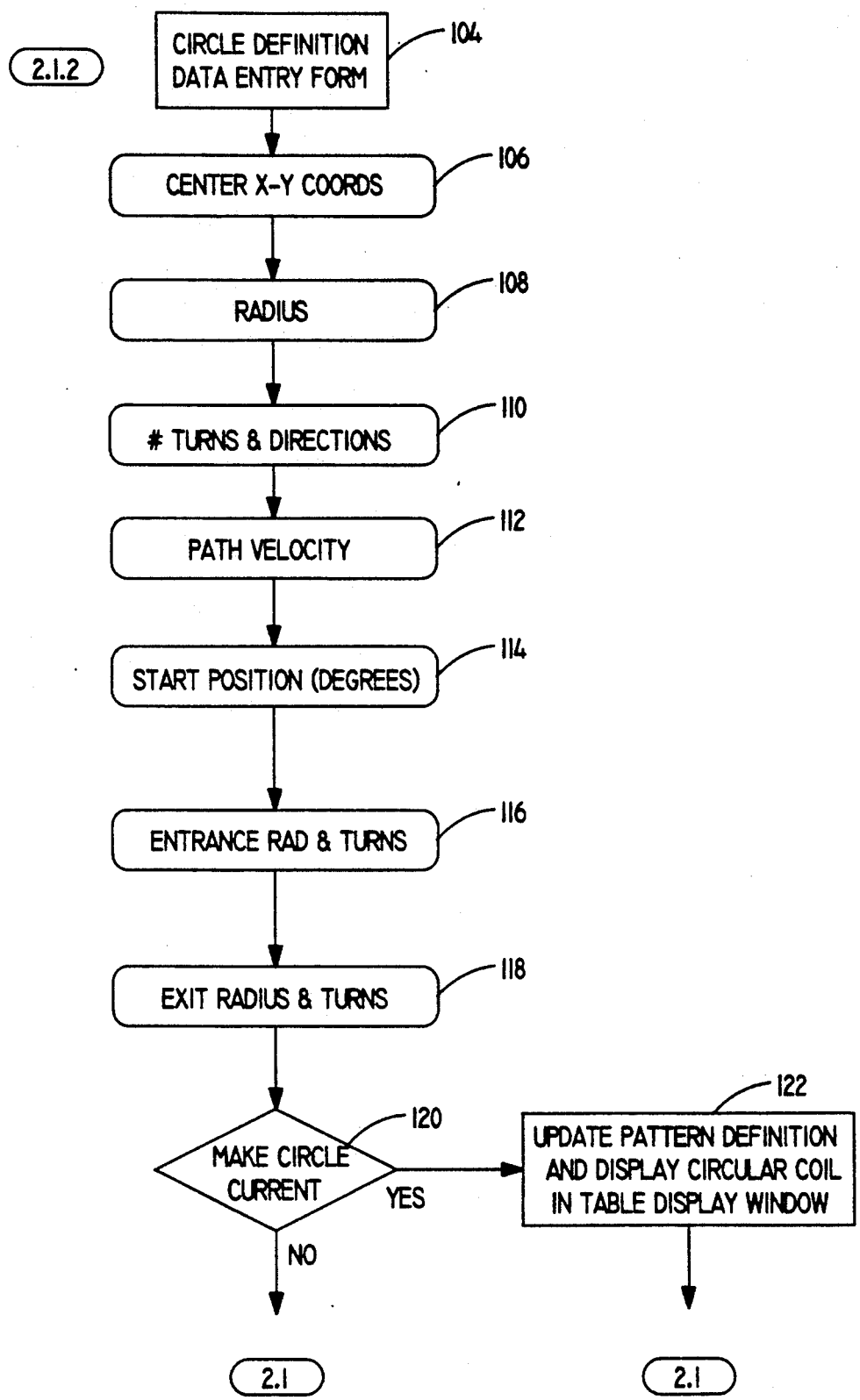
FIG. 3.8

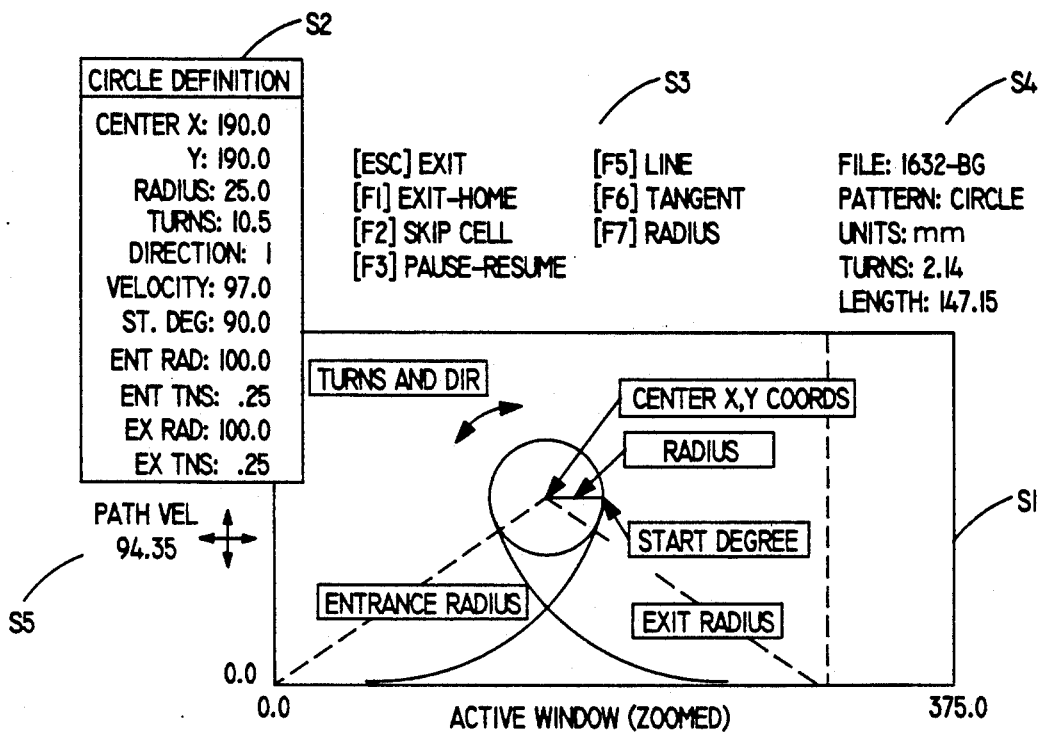
FIG. 3.9

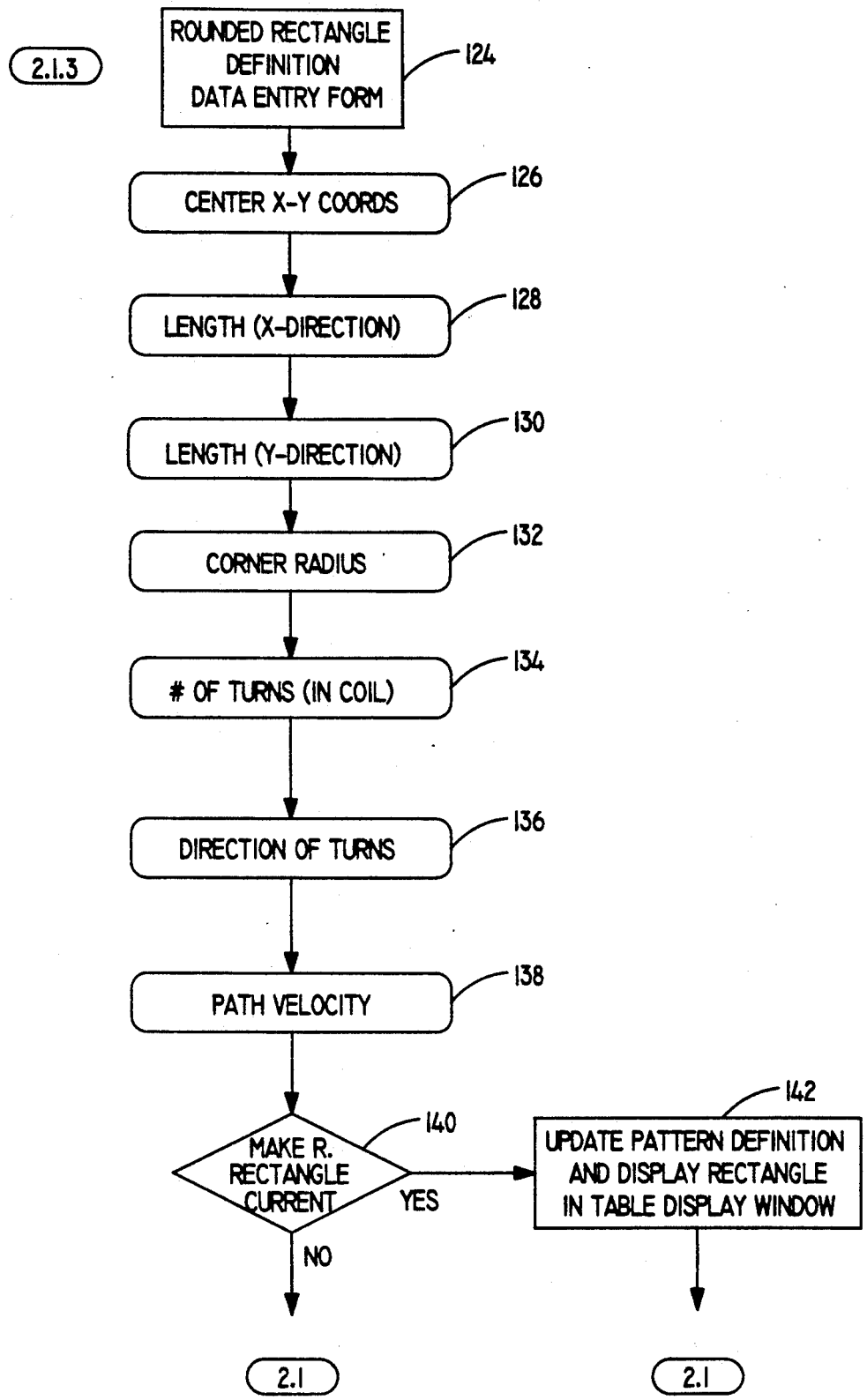
FIG. 3.10

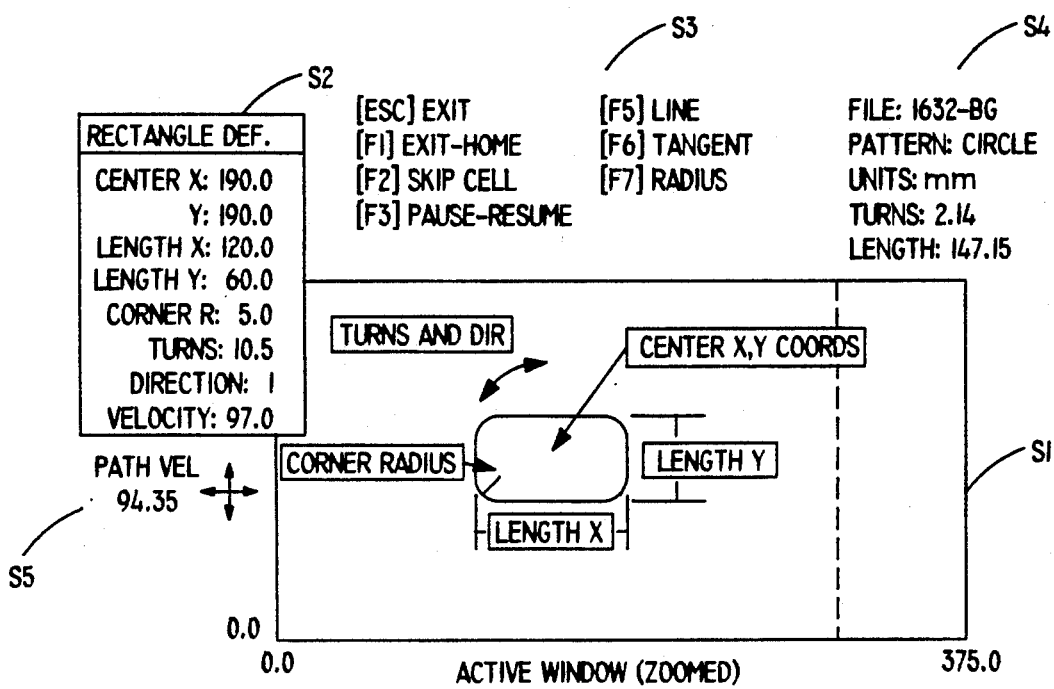
FIG. 3.11

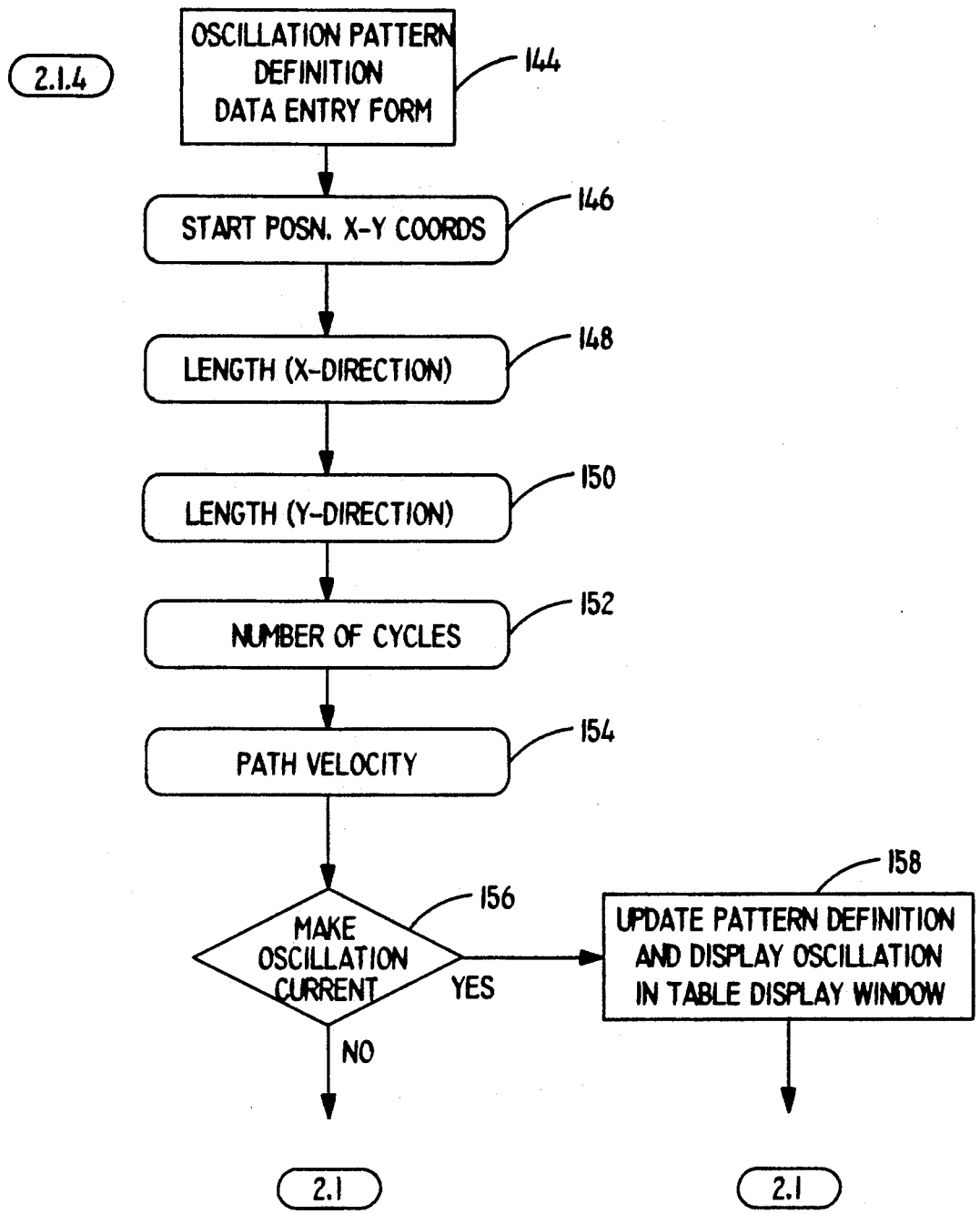
FIG. 3.12

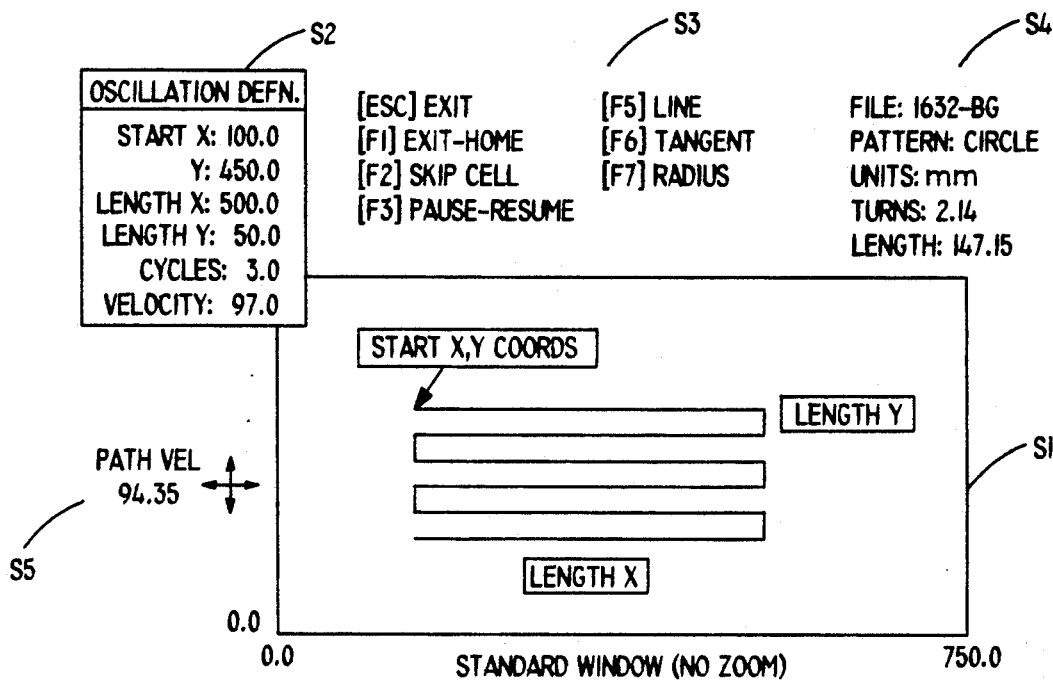
FIG. 3.13

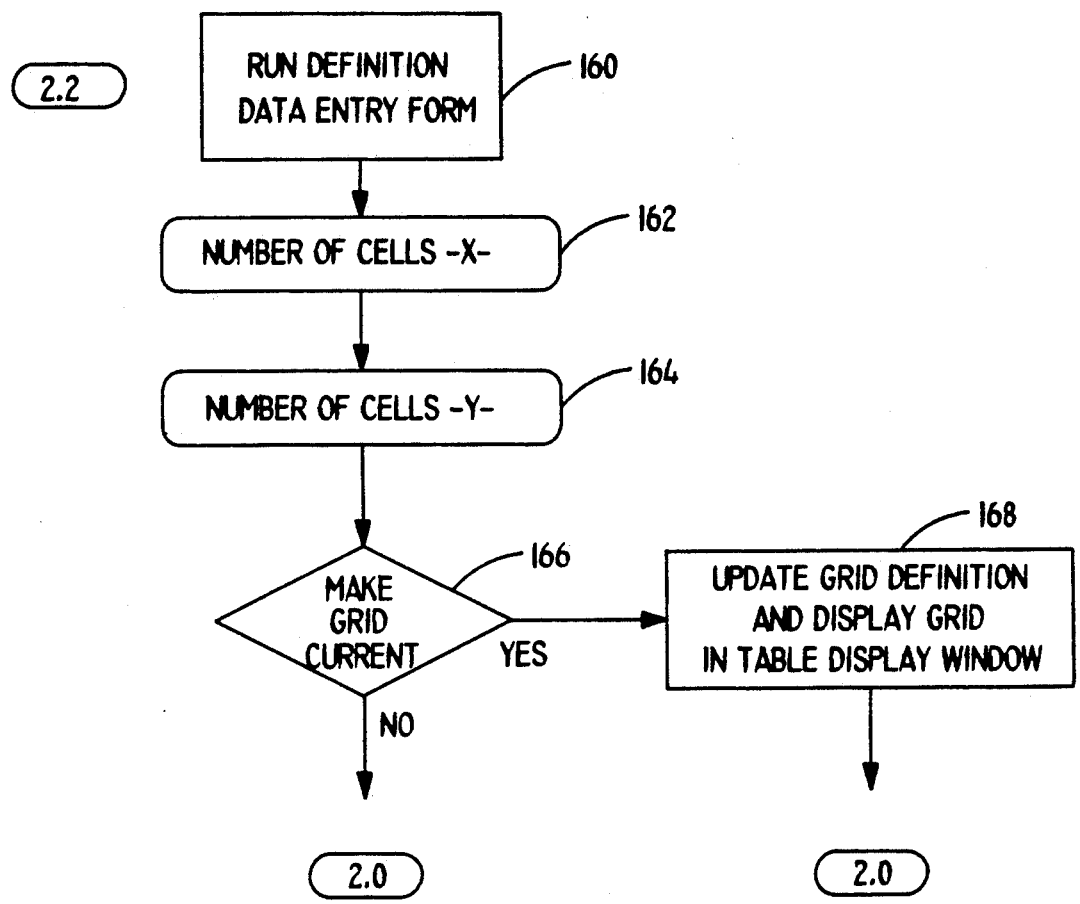
FIG. 3.14

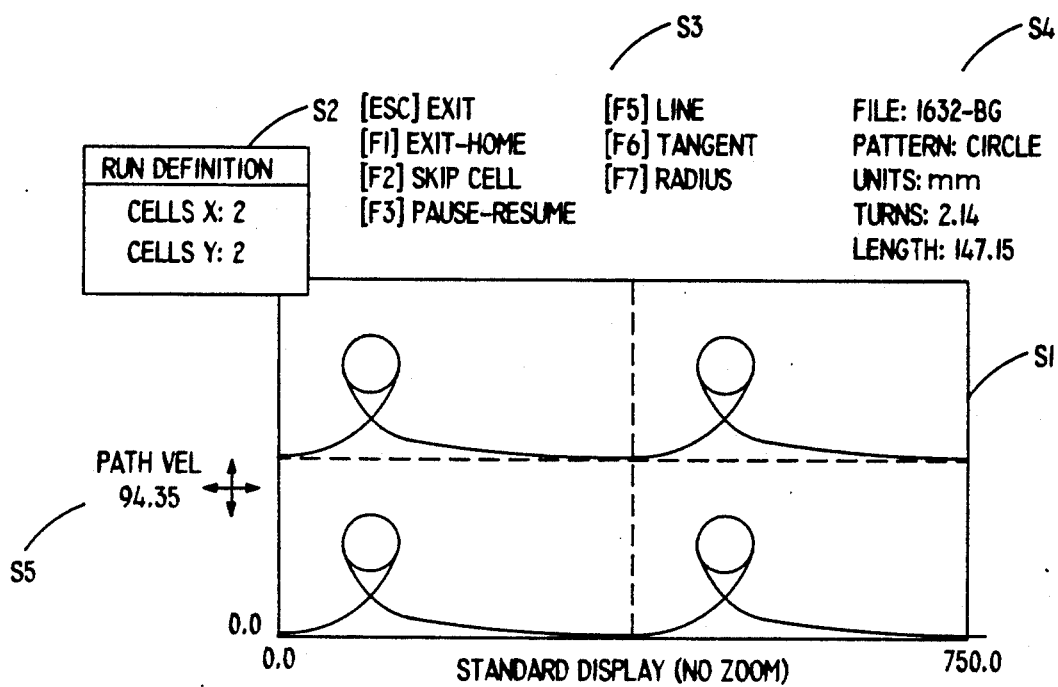
FIG. 3.15

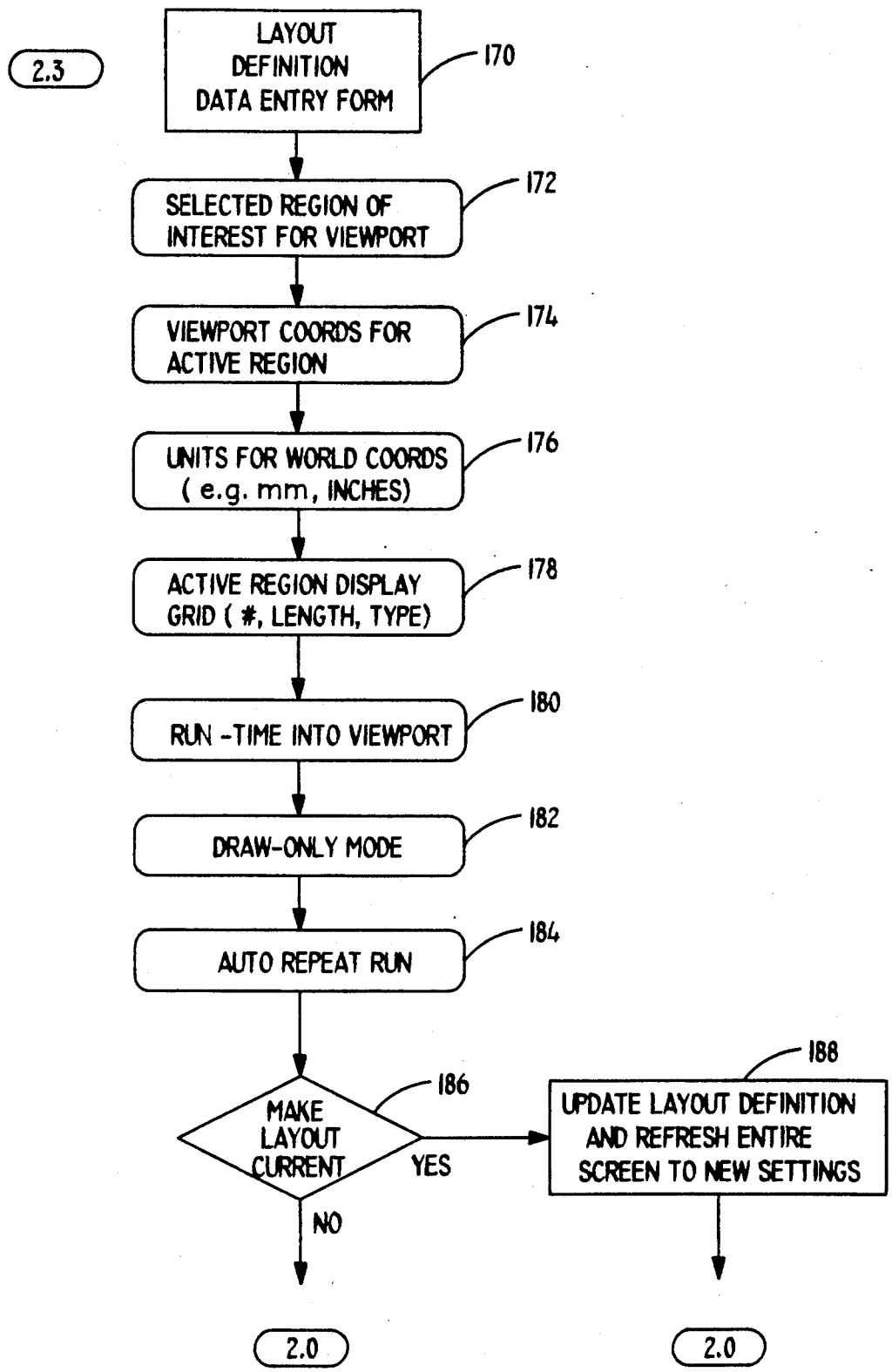
FIG. 3.16

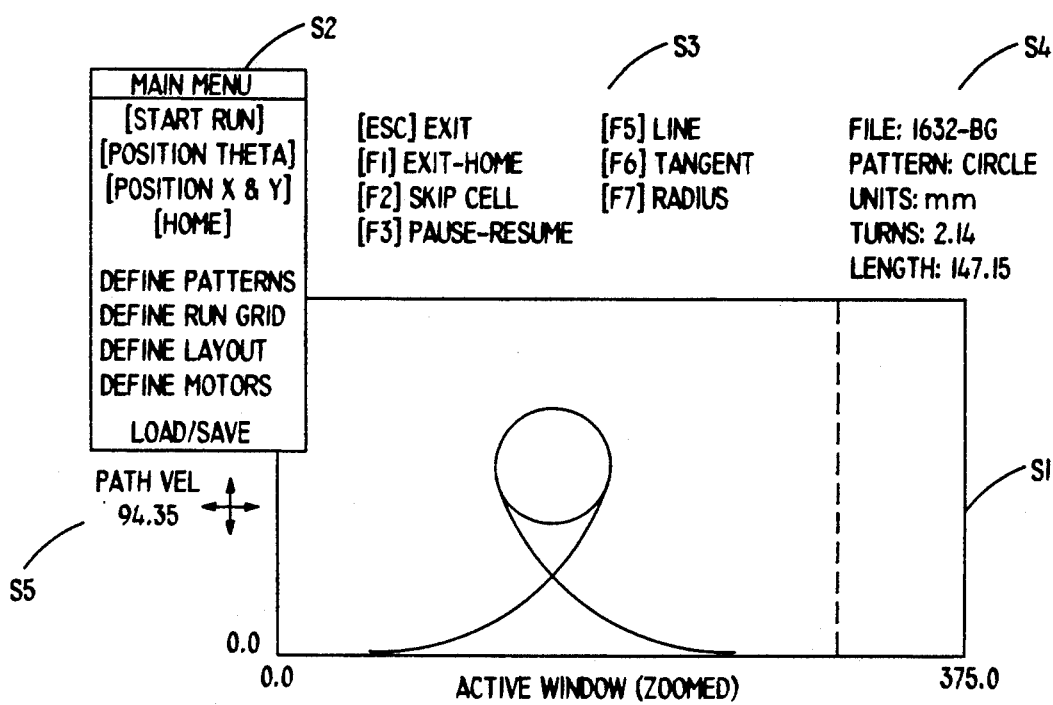
FIG. 3.17

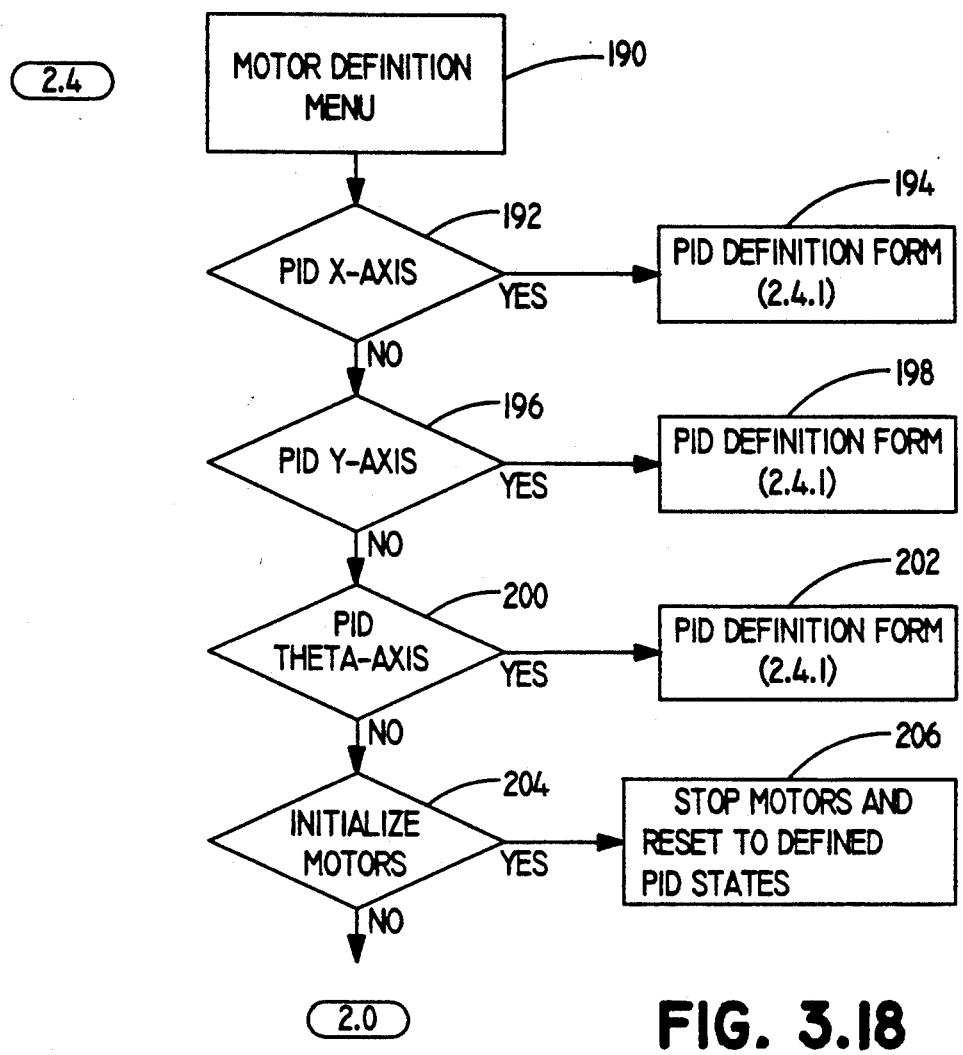
FIG. 3.18

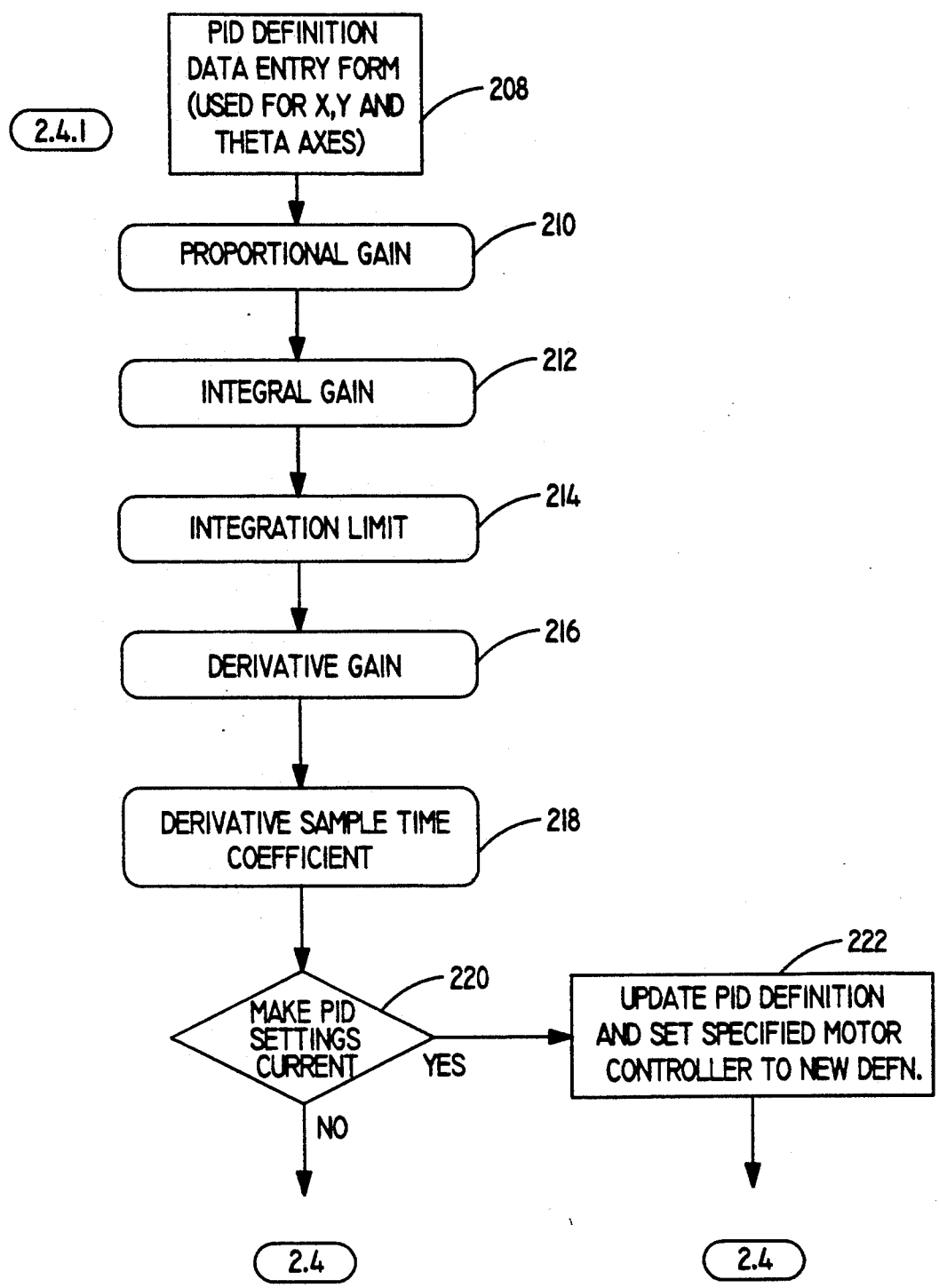
FIG. 3.19

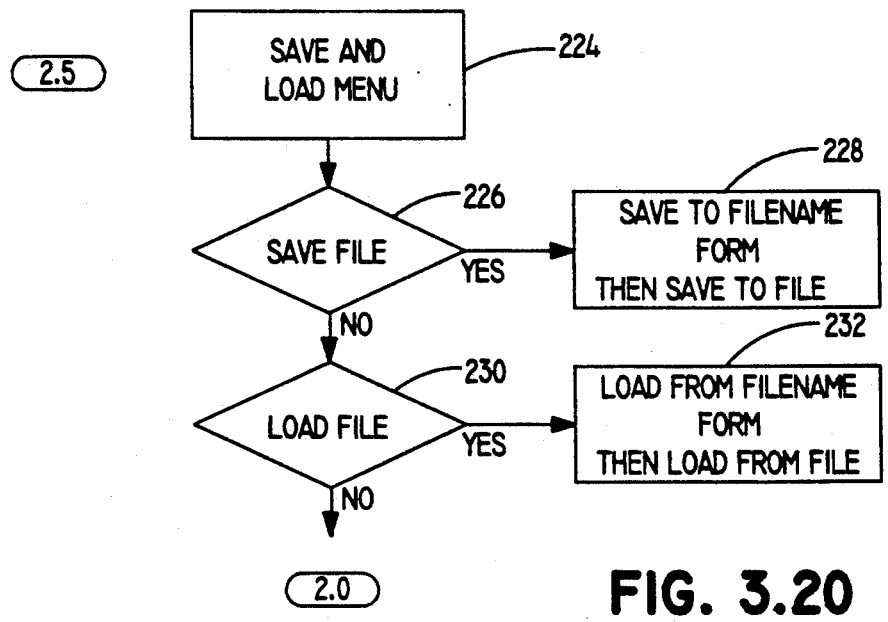
FIG. 3.20
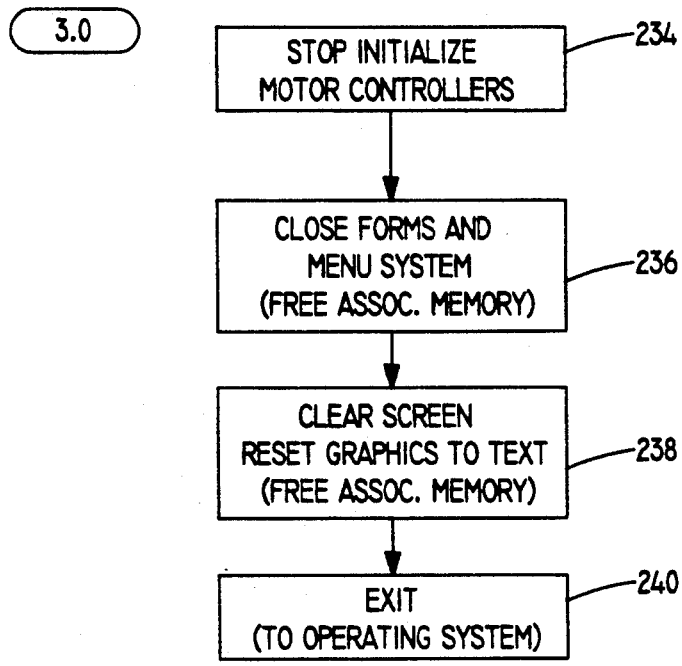
FIG. 3.21

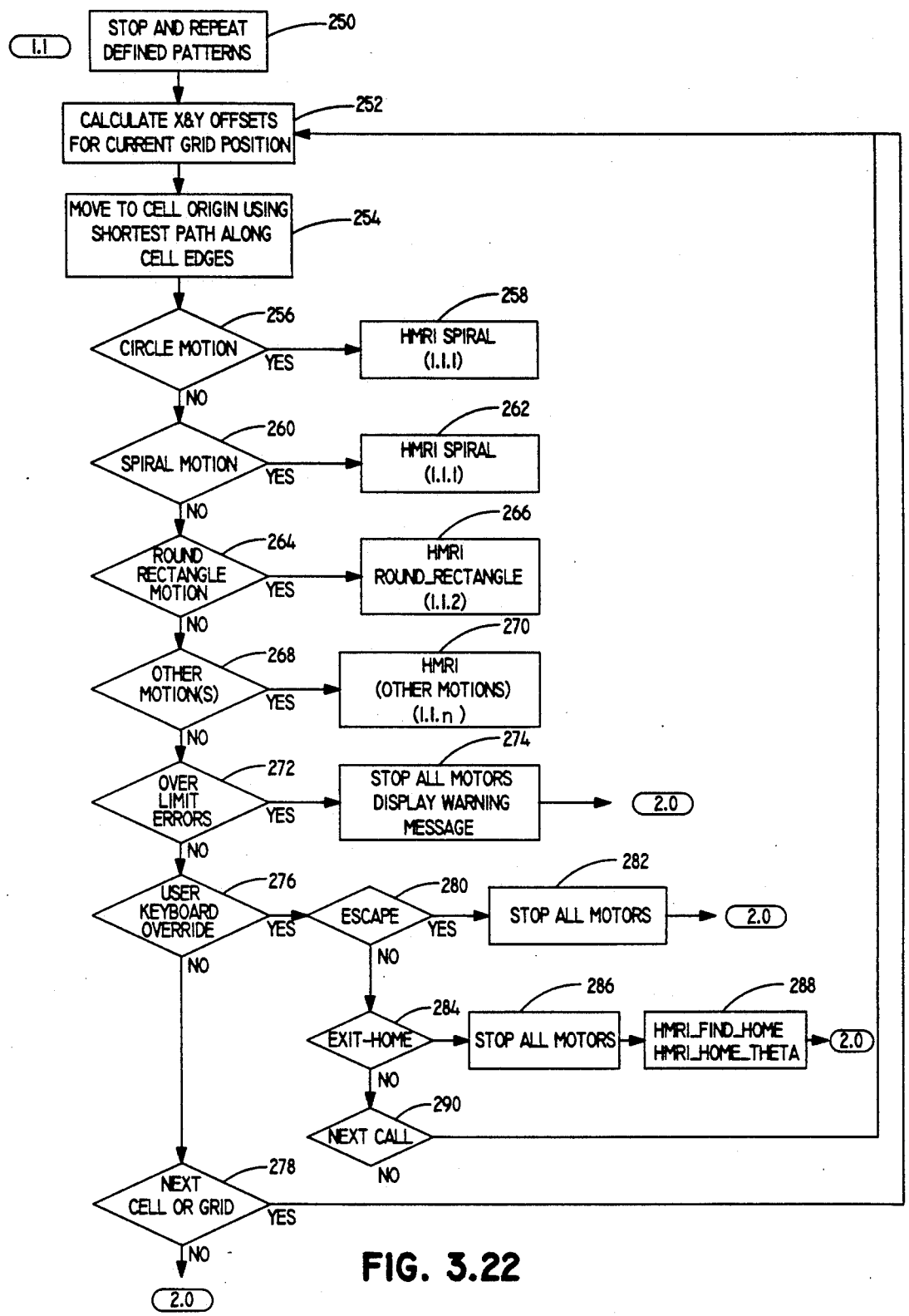
FIG. 3.22

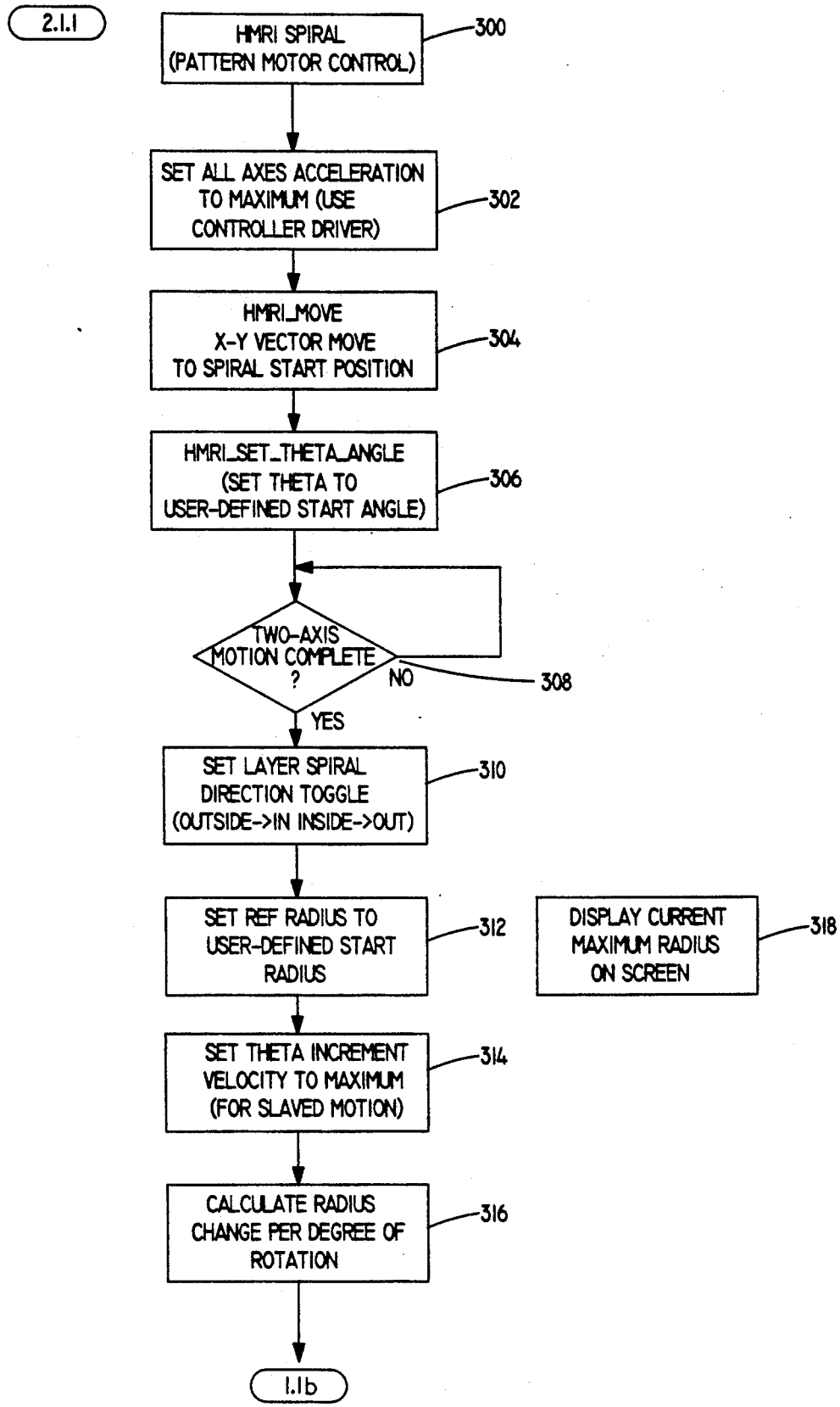
FIG. 3.23

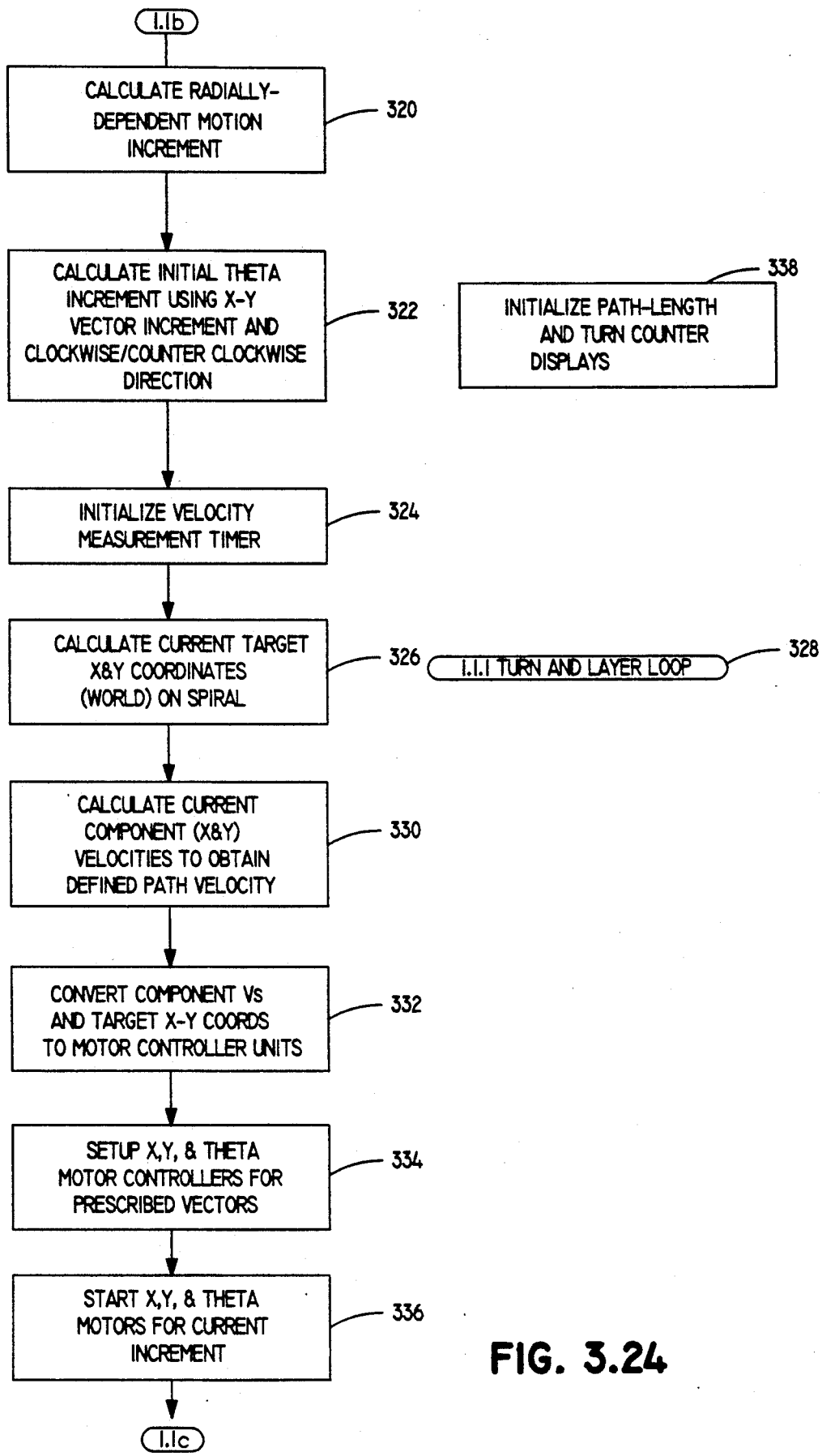
FIG. 3.24

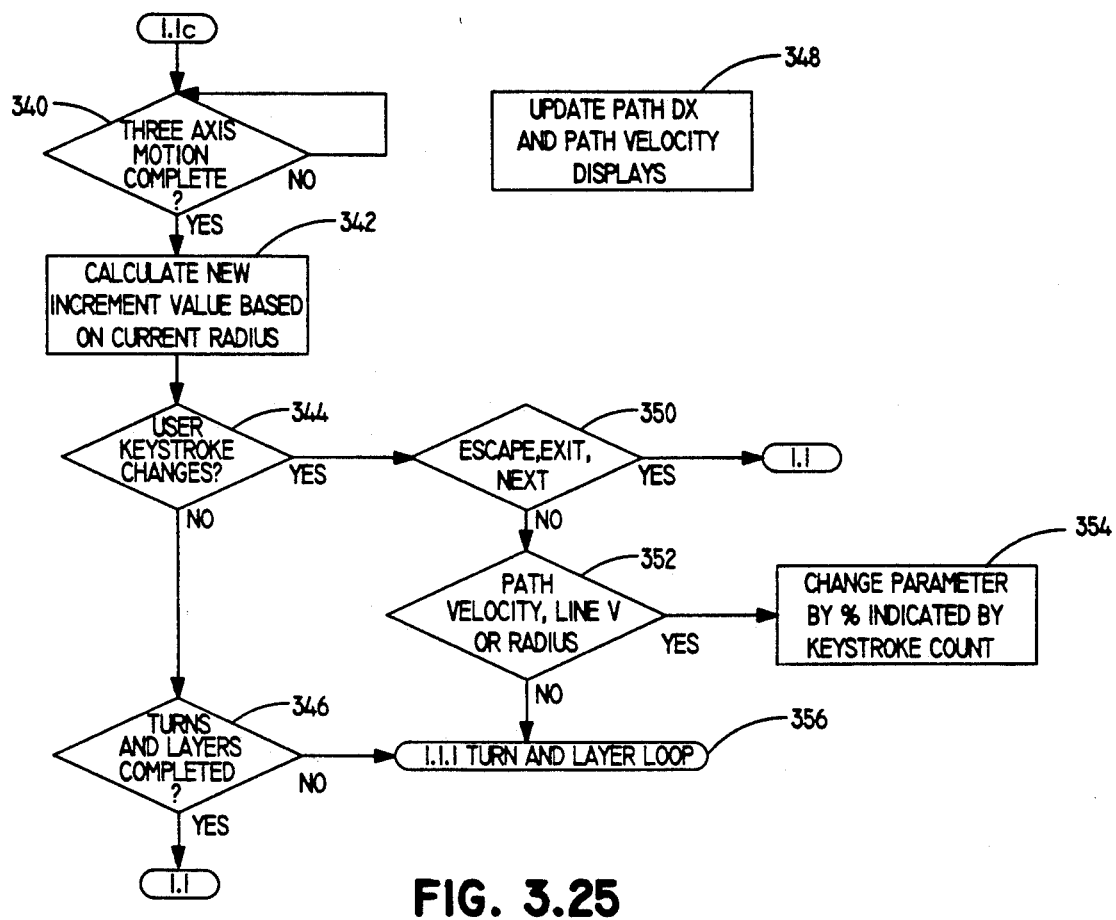
FIG. 3.25

METHOD AND APPARATUS FOR CASTING HOLLOW FIBER MEMBRANES

This is a continuation-in-part of copending U.S. Ser. No. 07/831,142, filed Feb. 4, 1992 (Milliken and Barnes), now abandoned.

FIELD OF THE INVENTION

The present invention generally relates to methods and apparatus for manufacturing tubular hollow fiber membranes, and more particularly relates to a computer controlled machine for automatically casting hollow fiber membranes.

BACKGROUND OF THE INVENTION

The present invention deals with the manufacturing process of casting various configurations of tubular hollow fiber membranes, for example, membranes that have a 6 millimeter (mm) diameter tubular shape with a wall thickness of approximately 0.125 mm. Such membranes may be used in an artificial pancreas, as described by Chick et al. in U.S. Pat. No. 5,002,661, issued Mar. 26, 1991. These membranes, however, are very fragile and difficult to form. It is particularly difficult to form tight coil and spiral shapes with such a wall-to-diameter ratio.

A known casting method comprises forcing a polymeric fluid out of an annular orifice of a nozzle of a coextrusion die while forcing a coagulating fluid out of a center core of the nozzle. A phase inversion process occurs at the point of contact between the two fluids; as a consequence, the polymeric fluid coagulates and forms a tubular structure. The tubular structure's coagulation rate is mitigated by solvents in the coagulation fluid, which allows for some manipulation of the fiber before final hardening occurs. A large bath of water is present a few millimeters below the extrusion die. The forming tubular structure is immersed into the bath, where further coagulation commences, and formed into the desired configuration before it can become fully congealed.

In certain applications, it is desired to use hollow fiber membranes in specific shapes or configurations, for example in a spiral or coiled shape. It is important, however, that no distortions or crimping occur in the membrane wall.

SUMMARY OF THE INVENTION

Accordingly, an object of the present invention is to provide an automated system for casting hollow fiber membranes into a variety of prescribed shapes, including spiral, linear, circular, rectangular, etc. In addition, the system should be efficient and provide a high level of repeatability. It would also be advantageous to have the capability to change the configuration during casting ("on the fly"), which would increase the productivity of the system.

To achieve these goals, the inventors decided to move the nozzle over a stationary coagulation bath. In preferred embodiments, a computer is used to control the motion of the nozzle, in a plane parallel to the stationary coagulation bath, to make a membrane with the desired shape. The casting is complicated by the fact that the nozzle must be constantly oriented in a manner that will compensate for distortions that occur in wall thickness. Such distortions occur due to bending of the membrane as it is being cast. Unless the flow pattern of the extrudate is adjusted to provide more polymer to the outside of the curve than to the inside, the outer fibers of the structure are stretched and the inner fibers are compressed, which causes the outer wall to be thinner than the inner wall. To compensate for this, the nozzle's annulus is offset to make one portion of the annulus slightly thicker than an opposing portion at the point where the fluids exit the nozzle. According to the invention, the orientation of the nozzle is controlled such that more of the polymer is provided along the outer edges of the curved sections of a membrane than along the inner edges. This results in a uniformly symmetric wall thickness. In preferred embodiments, a third axis of rotation, called "theta" ($\theta$), is included in the control program ("theta" and "$\theta$" are used interchangeably in this specification and the accompanying drawings). As the nozzle is moved along a radius through an angle of, e.g., 90°, the nozzle is rotated in the same direction by 90°, but the rotation is coordinated as the turn is made.

Accordingly, methods encompassed by the present invention comprise the steps of (a) forcing a polymeric fluid out of an annular orifice of a nozzle of a coextrusion die while forcing a coagulating fluid out of a center core of said nozzle, and (b) automatically effecting movement of said nozzle in a plane above and parallel to a surface of a coagulation bath while so controlling said movement as to form in said bath hollow fiber membranes of a prescribed shape. In preferred embodiments, step (b) comprises effecting coordinated movement of the nozzle relative to at least three axes, X, Y, and $\theta$, so as to cast hollow fiber membranes of a substantially uniform wall thickness. In accordance with the invention, the polymeric fluid is extruded through an annular orifice that is offset within the nozzle and the nozzle may be rotated about the $\theta$ axis in coordination with the movement along the X and Y axes. The movement of the nozzle may advantageously be effected in accordance with the offset of the annular orifice and the viscosity of the polymeric fluid. In one preferred embodiment, the method is adapted to cast hollow fiber membranes having an inner diameter of approximately 4-7 millimeters and a wall thickness of approximately 100-200 micrometers. Of course, the present invention is also capable of achieving other ranges of diameters and wall thicknesses.

Apparatus in accordance with the present invention include means for carrying out the foregoing steps, including a co-extrusion die having a nozzle with an offset annular orifice and a center core, means for forcing a polymeric fluid out of said annular orifice while forcing a coagulating fluid out of said center core, and means for automatically moving said nozzle in a plane above and parallel to a surface of a coagulation bath while so controlling said movement as to form in said bath hollow fiber membranes of a prescribed shape.

In addition, the present invention encompasses computer storage media (e.g., a computer disk, tape) in which are encoded instructions (software) for control of a system for automatically casting hollow fiber membranes, the system including X, Y and $\theta$-directional servomotors operatively coupled to a computer via at least one servodriver, a tub for holding a coagulation bath and a co-extrusion die with, an offset annular orifice. Software in accordance with the invention comprises code for automatically effecting movement (including rotation) of the nozzle in a plane above and parallel to a surface of a coagulation bath while so controlling the movement as to form hollow fiber membranes of a prescribed shape.

By employing different computer algorithms, the present inventors have successfully produced coils, spirals, straights and other shapes. The computer controls the shape and coordinates the acceleration, velocity, displacement and positioning of the nozzle to match the requirements of different polymeric viscosities and solvent concentrations. The X, Y and θ motions are calculated on the fly, so changes in shape are easy to make. Once an acceptable configuration is attained, the relevant parameters may be stored for future recall. Other features of the invention are discussed below in connection with a detailed description of preferred embodiments.

BRIEF DESCRIPTION OF THE DRAWINGS

FIGS. 3.1–3.25 depict a flowchart and associated exemplary screen displays of a computer program for controlling a membrane casting system in accordance with the present invention.

DETAILED DESCRIPTION OF PREFERRED EMBODIMENTS

As discussed above, membrane casting systems of the present invention include a co-extrusion die having a nozzle with an offset annular orifice, means for forcing a polymeric fluid out of the annular orifice while forcing a coagulating fluid out of the center core, and means for automatically moving the nozzle above a coagulation bath. The movement of the nozzle is automatically controlled, via a pre-programmed computer, to form hollow fiber membranes of a prescribed shape.

Figure 1:
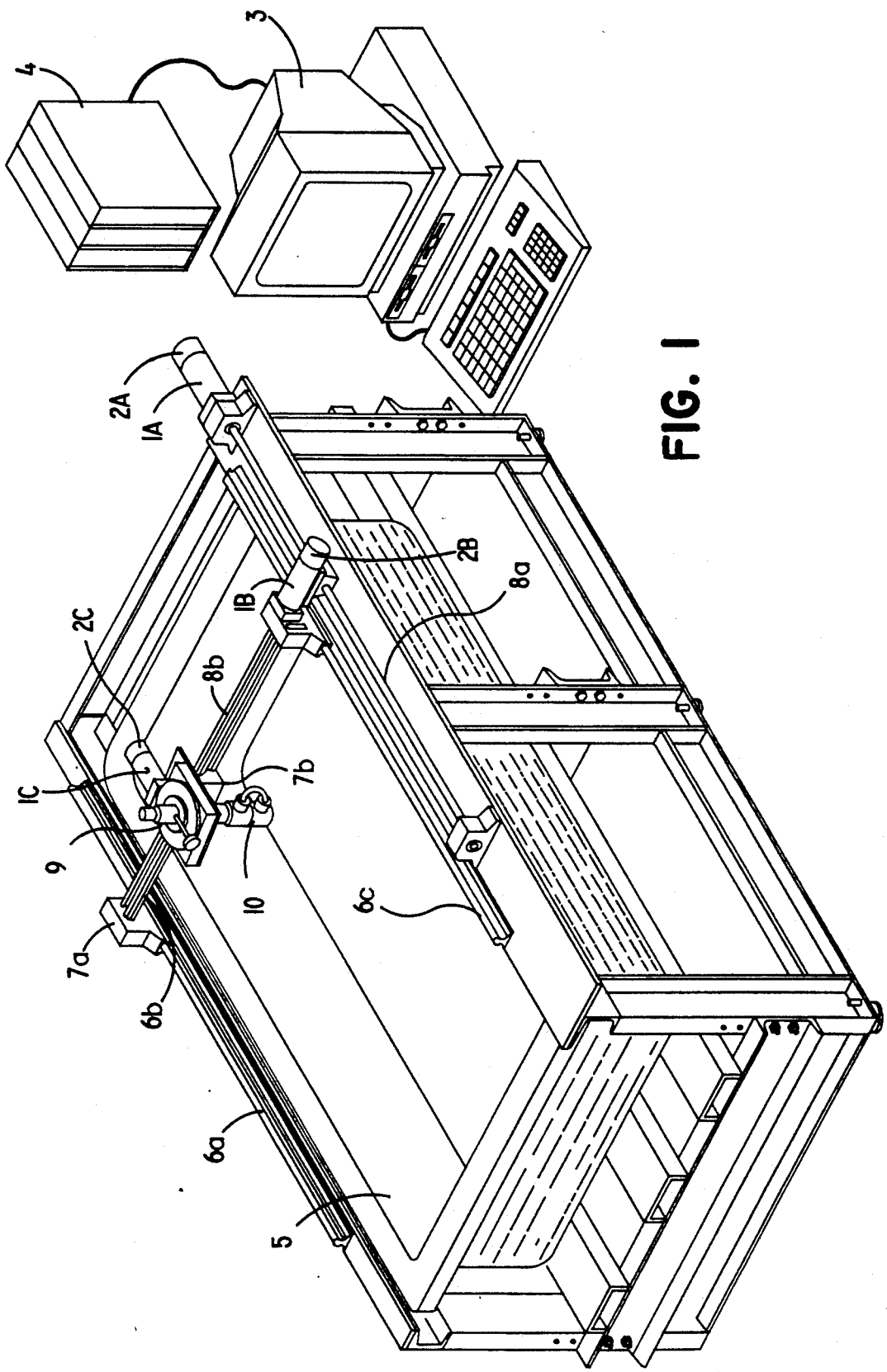
FIG. 1 depicts a membrane casting system embodying the present invention.

FIG. 1 depicts one embodiment of a membrane casting system of the present invention. This particular embodiment includes X, Y and θ-directional servomotors 1A, 1B and 1C, each of which is coupled to an associated position encoder 2A, 2B and 2C. The respective motors are controlled by a computer 3 via one- and two-axis servodrivers 4 and an associated interface card (not shown). The computer is programmed to operate according to software that is described in detail below with reference to FIGS. 3.3–3.25. Also included in the system are a tub 5 for holding a coagulation bath (not shown), bearing ways 6A–6C, carriages 7A, 7B, screw drives 8A, 8B, rotary table 9 and co-extrusion die 10. The servomotors in this embodiment (50 oz.-in. torque, 0–60 VDC) are available under Model No. M2250 from the Baldor Motion Products Group, Fort Smith, Ark.; the servodrivers (PWM servo amps) are available under Model TSD Series One and Two Axis from the Baldor Motion products Group, Plymouth, N.H.; the encoders (1000 pulse per revolution, differential, open collector type) are available under Model No. LBL from Sumtak, Somerset, N.J.); and the interface card is available under Model No. PC/MC 2503 from Motion Research Inc., Plymouth, Minn. Note, however, that the invention is not limited to this specific embodiment.

Figure 2:
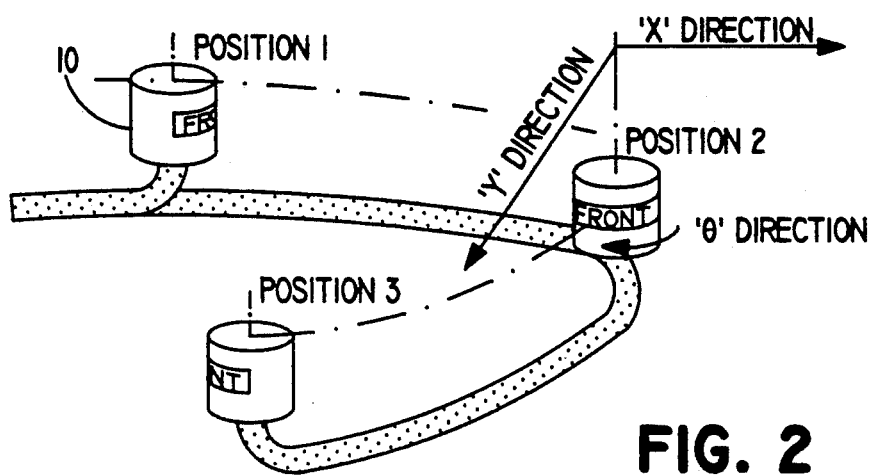
FIG. 2 depicts the coordinated movement with respect to X, Y and θ axes of a co-extrusion die or nozzle in accordance with the present invention.

FIG. 2 depicts how the X, Y and θ-directional movement of the co-extrusion die 10 is coordinated so that the front of the die is kept in a fixed position relative to the path being followed in casting the fiber. As mentioned above, this coordinated movement allows the system to cast hollow fiber membranes of a uniform wall thickness when the polymeric fluid is extruded through an offset annular orifice within the nozzle. The movement of the nozzle may advantageously be effected to maintain a constant fluid flow rate, which is a function of the offset of the annular orifice and the viscosity of the polymeric fluid.

FIGS. 3.1–3.25 depict a flowchart for programming the computer 3 and associated exemplary screen displays. The flowchart portions of the figures illustrate the operation of the computer in controlling the system and the screen display portions illustrate the user interface aspects of the system.

FIG. 3.1 shows an initial, set-up portion of the program. First, at block 11, the system loads a default object file. The default object file contains data that defines the default (or presumed) layout, patterns, repeat grid, and motor control parameters. (The "layout" is the manner in which the image of the casting table is mapped to the computer screen. The grid is a series of lines drawn on the screen to divide the casting window into cells, where each pattern is drawn once in each cell.) At block 12, the menu and data entry forms are initialized (these forms are described below). At block 14, graphics parameters are initialized and the casting surface window and information window are displayed (these windows are described below). At block 16, the system waits until the user verifies that the nozzle is in a satisfactory condition (e.g., that it won't run into anything during operation). At block 18, the display screen is cleared. At block 20, the motor controllers are initialized and initial PID (proportional, integral, derivative) constants are set. Note that PID constants are well-understood in the motor control art; they essentially use feedback data to regulate the motor output. At block 22, the home (i.e., reference) positions of the X, Y and θ motors are determined.

Before continuing with the description of the operation of the computer 9, the format of the screen display will briefly be described with reference to FIG. 3.2. The screen is divided into five areas, S1–S5: Area S1 is an "active casting window" in which images of the casting table and membrane being cast are displayed; area S2 is for displaying menus and forms from which a user selects or into which a user enters data; area S3 displays a help window indicating functions corresponding to certain function keys of the computer; area S4 displays a real-time information window; and area S5 displays real-time mode information (e.g., the velocity of the casting die). The active casting window S1 also depicts the "step and repeat" casting grid, which is described below. Specific examples of these windows are also described below.

Referring now to FIGS. 3.3 and 3.4, the computer continues operation at block 24 (FIG. 3.3), in which the main menu is displayed and the system waits for user input. As shown in FIG. 3.4, the main menu is displayed in area S2 (the menus and forms window) and includes the following choices: start run, position theta (move die to selected theta position), position X and Y (move die to selected X,Y position), home (move die to home position in X, Y and θ), define patterns, define run grid, define layout, define motors and load/save. These options are respectively indicated by decision blocks 26, 30, 34, 38, 42, 46, 50, 54 and 58 of FIG. 3.3. An exemplary circle pattern of 2.14 turns and a length of 147.15 mm is displayed in active casting window S1 of FIG. 3.4, as reflected by the real time information window S4. In addition, real-time mode window S5 indicates a path velocity of 94.35 millimeters per second, and help window S3 shows the function keys and their corresponding functions (exit, exit-home, skip cell, pause-resume, line, tangent and radius). These functions are not described in detail in this specification, since they are well known in the art and are not part of the claimed invention.

Referring to FIG. 3.3, when the user selects a desired function, the computer accordingly branches to one of the following blocks:
28 step and repeat current pattern (this block is described below with reference to FIG. 3.24);
32 set head angle, in which the user sets the die angle using arrow keys;
36 set X and Y position, in which the user sets the die to a selected X,Y position using arrow keys;
40 find home, in which the table is scanned in the X and Y directions until the home switches are found;
44 pattern definition (this block is described below with reference to FIG. 3.5);
48 definition data entry (this block is described below with reference to FIGS. 3.14 and 3.15);
52 layout definition data entry (this block is described below with reference to FIGS. 3.16–3.19);
56 motor definition (this block is described below with reference to FIG. 3.20);
60 save/load (this block is described below with reference to FIG. 3.22).

Referring to FIG. 3.5, the pattern definition operation commences at block 62, in which the pattern definition menu is displayed. Decision blocks 64, 68, 72, 76 and 80 respectively indicate pattern options that the user may select, including spiral, circle, rounded rectangle, oscillation, and clear screen. The computer branches, upon the selection of one of these options, to the selected one of the following blocks:
66 spiral definition;
70 circle definition;
74 rounded rectangle definition;
78 oscillation definition;
80 reset graphics display.
The spiral definition block 66 is described below with reference to FIGS. 3.6 and 3.7, the circle definition block 70 is described below with reference to FIGS. 3.8 and 3.9, the rounded rectangle definition block 74 is described below with reference to FIGS. 3.10 and 3.11, and the oscillation definition block 78 is described below with reference to FIGS. 3.12 and 3.13.

Referring now to FIG. 3.6, the spiral definition data entry procedure commences at block 84. At block 86, the user enters desired X,Y coordinates for the center of the pattern. At block 88, the user enters the start and end radius of the spiral (these parameters are illustrated in FIG. 3.7). At block 90, the user enters the number of turns, the number of layers and the direction of the spiral (i.e., clockwise or counter-clockwise). In the exemplary spiral pattern of FIG. 3.7, the number of turns is 4, the number of layers is 2 and the direction is negative, as illustrated in window S2. (The meaning of these parameters is indicated in FIG. 3.7. Briefly, each layer lies in a plane, and a pattern may have one or more layers connected together by a continuation of the curve. The number of turns is the number of times the pattern traverses 360°.) At block 92, the user enters the path velocity. At block 94, the user enters the start position in degrees. At block 96, the user enters the entrance radius (distance from center of spiral to X=0, Y=0) and number of turns. At block 98, the user enters the exit radius and turns. The goal in setting the entrance and exit radii is to provide a smooth entrance/exit to/from the pattern. At block 100, the user decides whether to make the just-defined spiral the "current" pattern; if so the computer at block 102 updates the pattern definition variables and displays the spiral pattern in the table display window S1, as shown in FIG. 3.7.

FIGS. 3.8 and 3.9 depict the procedure for defining a circle pattern and thus are similar to FIGS. 3.6 and 3.7, which show the procedure for defining a spiral pattern. The circle definition data entry process begins at block 104 (FIG. 3.8), in which the data entry form is depicted in window S2 (FIG. 3.9). The user then enters the center X,Y coordinates (block 106), radius (block 108), number of turns and direction (block 110), path velocity (block 112), start position (block 114), entry radius and turns (block 116), and exit radius and turns (block 118). At block 120, the user decides whether to make this pattern current; if so the computer at block 122 updates the pattern definition variables and displays the pattern in the table display window S1 (FIG. 3.9).

FIG. 3.10 and 3.11 are respectively a flowchart portion of the program for the rounded rectangle pattern definition procedure (block 74, FIG. 3.5) and a corresponding exemplary screen display. At block 124, the rounded rectangle definition data entry procedure begins with the display of a data entry form in window S2 (FIG. 3.11). At block 126, the center X,Y coordinates are entered; at block 128, the length of the pattern along the X axis is entered; at block 130, the length along the Y axis is entered; at block 132, the corner radius is entered; at block 134, the number of turns is entered, at block 136, the direction is entered; and at block 138, the path velocity is entered. Exemplary values for each of the just-mentioned parameters are depicted in the data entry window S2 of the screen display of FIG. 3.11. The table window S1 indicates how each of these parameters is defined in the context of the present invention. At decision block 140 (FIG. 3.10), the user decides whether to make the pattern current; if so the computer branches to block 142 and updates the pattern definition variables and displays the pattern in window S1 (FIG. 3.11).

Referring now to FIG. 3.12, the oscillation pattern definition procedure (block 78, FIG. 3.5) commences at block 144. An exemplary oscillation display screen is depicted in screen 3.13. At block 146 (FIG. 3.12), the user enters the start position in X,Y coordinates; at block 148, the X axis length of the pattern is entered; at block 150, the Y axis length of the pattern is entered; at block 152, the number of cycles in the pattern is entered; an at block 154, the path velocity is entered. These parameters are defined as shown in FIG. 3.13. At decision block 156, the user decides whether to make this pattern the current pattern, and if so the computer at block 158 updates the pattern definition variables and displays the pattern in the table display window S1 (FIG. 3.13).

FIG. 3.14 depicts the procedure for the run definition data entry procedure 48 of FIG. 3.3. At block 160, the procedure commences with the display of the run definition entry form in window S2 of the display (FIG. 3.15). With this form the user enters the number of cells in the X direction (block 162) and the number of cells in the Y direction (block 164). In the example of FIG. 3.15, each of these values is 2, as reflected by the pattern displayed in window S1. At decision block 166, the user decides whether to make these entries current; if so the computer at block 168 updates the grid definition variables and displays the grid in the table display window S1 (FIG. 3.15). FIG. 3.15 shows an example of a 2 × 2 grid of identical circle patterns.

FIGS. 3.16 and 3.17 elaborate upon the layout definition data entry procedure 52 of FIG. 3.3. Referring to FIG. 3.16, the layout definition procedure commences at block 170, in which the layout definition menu is displayed in window S2, as shown in FIG. 3.17. At block 172, the user enters the selected region of interest for the display viewport; at block 174, the coordinates for the active region of the display are entered; at block 176, the units (millimeters or inches) for the world coordinates of the display are entered; at block 178, the parameters (number, length, type) for the active region display grid are entered; at block 180, the parameters of the run-time information viewport are entered; at block 182, the parameters for the draw-only mode (in which no membrane is actually cast) are entered; and at block 184, the parameters for the auto report mode (in which the program run is automatically repeated) are entered. At decision block 186, the user decides whether to make this layout the current layout, and if so the computer at block 188 updates the layout definition variables and refreshes the entire screen in accordance with the new layout definition data.

FIG. 3.17 depicts an exemplary screen display in connection with the procedure for changing world coordinates, or zooming. By comparing the display of FIG. 3.17 with the display of FIG. 3.15, it can be seen that by changing the coordinate limits for display window S1 the user can zoom in on a selected portion of the screen.

FIG. 3.18 further depicts the motor definition procedure 56 of FIG. 3.3. At block 190, the motor definition menu is displayed. At decision blocks 192, 196 and 200, the user selected the PID X axis, Y axis, or theta axis, and the computer accordingly branches to one of blocks 194, 198 or 202 to carry out the PID definition data entry procedure (FIG. 3.19 depicts a flowchart for this procedure). At decision block 204, the user decides whether to initialize the motors; if so the computer branches to block 206, in which the motors are stopped and reset to the newly-defined PID states.

Referring to FIG. 3.19, the PID definition data entry form is displayed at block 208. At blocks 210, 212, 214, 216 and 218, the user enters parameters for the proportional gain, integral gain, integration limit, derivative gain and derivative sample time coefficient (these are PID control parameters). At decision block 220, the user decides whether to make the just-defined PID settings current; if so the computer at block 222 updates the PID definition variables and sets the specified motor controller(s) in accordance with the new definition data.

FIG. 3.20 depicts the save and load procedure of block 60 of FIG. 3.3. At block 224, the save and load menu is displayed. At decision block 226, the user decides whether to save a file, and at block 228, the user enters the file name and the computer saves the file to the specified file. At decision block 230, the user decides whether to load a file from a specified file; at block 232, the user names the file and the computer loads the specified file.

FIG. 3.21 illustrates the portion of the flowchart for the rest of the procedure of FIG. 3.3, after the user-input procedures of blocks 24–60 are completed. At block 234, the computer initializes the motor controllers; at block 236, the computer closes the forms and menus system; at block 238, the computer clears the screen and resets an associated graphics card in the computer to text; and at block 240, the computer exits to the operating system.

FIGS. 3.22–3.25 depict the step and repeat current pattern procedure of block 28 of FIG. 3.3. This procedure commences at block 250 (FIG. 3.22). At block 262, the X and Y offsets for the current grid position are calculated. At block 254, the die is moved to the cell origin using the shortest path along the cell edges. At step 256, the computer determines whether a circle pattern has been requested; if so the computer branches to block 258. Similarly, at steps 260, 264 and 268, the computer determines whether a spiral pattern, rounded rectangle pattern, or other type of pattern has been requested, and accordingly branches to the appropriate one of blocks 262, 266 or 270. (Note that blocks 258, 262, 266 and 270 ar analogous to one another, therefore only block 258 will be further described in this specification. This is done with reference to FIGS. 3.23–3.25.)

At decision block 272, the computer determines whether overlimit errors have been detected, and if so branches to block 274 where the motors are stopped and a warning message is displayed. At decision block 276, the program detects whether a keyboard override has occurred, and if so branches to decision block 280, in which the computer determines whether the override was an escape; if an escape was requested block 282 is executed and all motors are stopped. If the override was not an escape, at block 284 the computer determines whether the override was an exit-home command; if so all motors are stopped at block 286 and the procedures of block 288 are executed, i.e., HMRI_find_home and HMRI_home_theta respectively set the motors to X,Y=0 and θ=0. At decision block 290, the computer detects whether the override was a request to move to the next cell, and if so branches to block 252. If no override was detected at block 276, the computer branches to block 278 where it determines whether a next cell or grid has been requested, and if so branches to block 252.

FIGS. 3.23–3.25 depict the portion of the flowchart for the HMRI_spiral procedure of block 258 of FIG. 3.22. This procedure commences at block 300 (FIG. 3.23). At block 302 the acceleration of each motor is set via the motor controllers to a maximum. At step 304 the HMRI_move procedure is executed, in which the X,Y motors move the die to its start positions. At block 306, the theta motor is set to the user-defined start angle. At decision block 308, the computer waits until the two-axis motion is complete. At block 310, the computer sets a logical toggle indicating the direction in which the pattern is to be traced, i.e., whether the spiral motion is to be from outside in or from inside out. At block 312, the computer sets the reference radius to the user-defined start radius. At block 314, the computer sets the theta increment velocity to its maximum value. At block 316, the computer calculates the amount of change in radius per degree of rotation. Block 318 indicates that the maximum radius is displayed on the screen.

Referring now to FIG. 3.24, at block 320 the computer calculates the radially-dependent motion increment. (This increment can be explained as follows: Since the fluid flows from the nozzle at a constant rate, the linear, or path, velocity of the nozzle must also be kept constant. Therefore the angular velocity of the nozzle changes as the radius of the pattern increases or decreases, and the rate of change in θ must be accordingly adjusted. The "radially-dependent motion increment" is used in adjusting the θ position of the nozzle as a function of the path radius.) At block 322, the initial theta increment is calculated using the X,Y increment and the clockwise/counter-clockwise direction indicator. At block 324, the velocity measurement timer is initialized. At block 326, the current target X and Y coordinates (the next desired position) on the spiral are calculated. At block 328, the basic pattern is repeated until all turns and layers are drawn. At block 330, the current component ($V_X$, $V_Y$) velocities are calculated to obtain the defined path velocity (($V_X^2 + V_Y^2)^{\frac{1}{2}}$). At block 332, the component velocities and target X,Y coordinates are converted to motor controller units (i.e., encoder counts). At block 334, the X, Y, and theta motor controllers are set up for the prescribed vectors. At block 336, the X, Y, and theta motors are started for the current increment.

Referring to FIG. 3.25, at decision block 340 the computer waits for the completion of the three-axis motion. At block 342, new increment values are computed on the basis of the current radius. At decision block 344, the computer decides whether any user-keystroke changes have occurred (note that the user may exercise real-time control over certain parameters via the keyboard, e.g., motor speed may be adjusted via the arrow keys); if so, at block 350 it determines what the user requested (escape, exit, or next). At block 352, the computer determines whether the user requested path velocity, line velocity (i.e., velocity of the die in moving between cells of the casting grid), or radius; if one of these was selected, the program branches to block 354 and changes the selected parameter by the percentage indicated by the keystroke count, which is determined by the duration the key was depressed. If, at decision block 344, no changes were requested, the computer proceeds to decision block 346 and determines whether all turns and layers are complete; if not, it branches to the turn and layer loop 356, which corresponds to loop 328 of FIG. 3.26.

In summary, the present invention provides a computer-controlled hollow fiber membrane casting system. The computer controls DC servomotors to move the casting die along three axes (X, Y, θ), and thus controls the final membrane shape, including wall thickness. The coagulation rate is modified by solvents to allow adequate time for membrane formation by viscous drag. Mandrels or guide blocks may be used in the bath to limit the movement or drift of the membrane as it is being cast.

Although this specification describes in some detail the operation of the computer, including specific user-interface procedures, and specifies particular hardware (motors, controllers, etc.), the true scope of the invention is not limited to those particular hardware or software elements. In addition, it will be apparent to those of ordinary skill in this art that the computer controlled casting system of this invention can be used for the preparation of a variety of different hollow fiber membranes, based on various polymers, copolymers or combinations thereof. An embodiment of the invention has been used to make hollow fiber membranes with a spiral coil shape of the kind depicted in FIG. 3.7, and with inner diameters in the range of approximately 0.1 to 10.0 millimeters, preferably 4-7 millimeters, and wall thicknesses in the range of approximately 25 to 500 micrometers, preferably 100-200 micrometers, (although the invention is not limited to casting fibers of any particular shape, diameter or wall thickness). As described in the above-referenced U.S. Pat. No. 5,002,661, such hollow fiber coils are especially useful in the context of an artificial pancreas.

What is claimed:

1. A method for automatically casting hollow fiber membranes of prescribed shapes, comprising the steps of:
   (a) forcing a polymeric fluid out of an annular orifice of a nozzle of a co-extrusion die while forcing a coagulating fluid out of a center core of said nozzle; and
   (b) automatically effecting movement of said nozzle in a plane above and parallel to a surface of a coagulation bath while so controlling said movement as to form in said bath hollow fiber membranes of said prescribed shapes.

2. The method cited in claim 1, comprising forcing said polymeric fluid out of an annular orifice that is offset within said nozzle and rotating said nozzle to achieve a substantially uniform wall thickness.

3. The method recited in claim 2, wherein step (b) comprises effecting coordinated movement of said nozzle relative to at least three axes, X, Y and θ, so as to cast hollow fiber membranes of a substantially uniform wall thickness.

4. The method recited in claim 3, further comprising adjusting the rate of said movement of said nozzle relative to said X, Y and θ axes in accordance with the offset of said annular orifice and the viscosity of said polymeric fluid.

5. The method recited in claim 1, wherein said steps (a) and (b) are adapted to cast hollow fiber membranes having an inner diameter of approximately 4-7 millimeters and a wall thickness of approximately 100-200 micrometers.

6. Apparatus for automatically casting hollow fiber membranes of prescribed shapes, comprising:
   (a) a co-extrusion die having a nozzle with an offset annular orifice and a center core;
   (b) means for forcing a polymeric fluid out of said annular orifice of said nozzle while forcing a coagulating fluid out of said center core; and
   (c) means for automatically moving said nozzle in a plane above and parallel to a surface of a coagulation bath while so controlling said movement as to form in said bath hollow fiber membranes of said prescribed shapes.

7. The apparatus recited in claim 6, further comprising means for effecting coordinated movement of said nozzle relative to at least three axes, X, Y and θ, so as to cast hollow fiber membranes of a substantially uniform wall thickness.

8. The apparatus recited in claim 7, further comprising means for rotating said nozzle about said θ axis in coordination with movement along said X and Y axes.

9. The apparatus recited in claim 8, further comprising means for adjusting the rate of said movement of said nozzle in accordance with the offset of said annular orifice and the viscosity of said polymeric fluid.

10. The apparatus recited in claim 6, adapted to cast hollow fiber membranes having an inner diameter of approximately 4-7 millimeters and a wall thickness of approximately 100-200 micrometers.

11. The method recited in claim 1, wherein said steps (a) and (b) are adapted to cast hollow fiber membranes having an inner diameter of approximately 0.1–10.0 millimeters and a wall thickness of approximately 25–500 micrometers.

12. The apparatus recited in claim 6, adapted to cast hollow fiber membranes having an inner diameter of approximately 0.1–10.0 millimeters and a wall thickness of approximately 25–500 micrometers.

* * * * *